(12) United States Patent
Deering, Jr.

(10) Patent No.: US 11,592,284 B2
(45) Date of Patent: Feb. 28, 2023

(54) VEHICLE AND TRAILER FRAME MEASURING SYSTEM

(71) Applicant: Infinity Laser Measuring LLC, Wayzata, MN (US)

(72) Inventor: Hartland William Deering, Jr., Webster, MN (US)

(73) Assignee: Infinity Laser Measuring LLC, Wayzata, MN (US)

(*) Notice: Subject to any disclaimer, the term of this patent is extended or adjusted under 35 U.S.C. 154(b) by 188 days.

(21) Appl. No.: 17/084,129

(22) Filed: Oct. 29, 2020

(65) Prior Publication Data

US 2021/0123726 A1    Apr. 29, 2021

Related U.S. Application Data

(60) Provisional application No. 62/927,643, filed on Oct. 29, 2019.

(51) Int. Cl.
| | |
|---|---|
| *G01B 11/24* | (2006.01) |
| *G01B 11/27* | (2006.01) |
| *G01B 11/14* | (2006.01) |
| *G08B 21/18* | (2006.01) |
| *G01B 5/00* | (2006.01) |

(52) U.S. Cl.
CPC ............ *G01B 11/24* (2013.01); *G01B 5/0025* (2013.01); *G01B 11/14* (2013.01); *G01B 11/272* (2013.01); *G08B 21/182* (2013.01)

(58) Field of Classification Search
CPC ...... G01B 11/24; G01B 5/0025; G01B 11/14; G01B 11/272; G08B 21/182

USPC .......................................................... 33/288
See application file for complete search history.

(56) References Cited

U.S. PATENT DOCUMENTS

| | | | | | |
|---|---|---|---|---|---|
| 4,454,659 | A | * | 6/1984 | Eck ......................... | G01B 5/255 33/288 |
| 4,630,379 | A | * | 12/1986 | Wickmann ............ | G01B 11/245 33/600 |
| 5,058,286 | A | * | 10/1991 | Chisum .................. | G01B 5/207 33/608 |
| 5,295,073 | A | * | 3/1994 | Celette ................. | G01B 11/002 701/33.1 |
| 5,341,575 | A | * | 8/1994 | Chisum .................. | G01B 5/207 33/608 |
| 5,515,613 | A | * | 5/1996 | Hinson .................... | G01B 5/20 33/608 |

(Continued)

*Primary Examiner* — Zhen Y Wu
(74) *Attorney, Agent, or Firm* — Skaar Ulbrich Macari, P.A.

(57) ABSTRACT

A measurement system for frames of heavy duty trucks and trailers does not require a dimensional reference database. A plurality of electronic targets are attached to selected target points on the frame. A position of the laser scanner from the selected target points is determined. Measurement data for additional targets is determined. The frame dimensions are then analyzed for defects that are greater than a pre-set tolerance. Measurements outside of a tolerance range can be flagged with contrasting color. The results of the frame analysis are shown on the user's screen, on the electronic target, and can be printed out or emailed for future inspection. The frame can be repaired while the targets and laser scanner are still deployed so that the measurement system can continue to display the status of the measurement points in real time and the success of the repairs can be confirmed.

19 Claims, 41 Drawing Sheets

(56) References Cited

U.S. PATENT DOCUMENTS

| | | | | |
|---|---|---|---|---|
| 5,801,834 | A * | 9/1998 | Danielson | G01B 5/0025 356/620 |
| 6,115,927 | A * | 9/2000 | Hendrix | G01B 11/245 382/152 |
| 7,424,387 | B1 * | 9/2008 | Gill | G01B 11/272 33/288 |
| 8,381,409 | B2 * | 2/2013 | Knoke | G01B 11/24 33/228 |
| 8,997,361 | B2 * | 4/2015 | Knoke | G01B 11/24 33/290 |
| 11,105,609 | B2 * | 8/2021 | Stephens | G01B 11/026 |
| 11,130,477 | B2 * | 9/2021 | Watts | G06Q 10/20 |
| 2005/0131586 | A1 * | 6/2005 | Srack | G01B 5/0025 701/1 |
| 2006/0186699 | A1 * | 8/2006 | Davis | B62D 23/005 296/205 |
| 2007/0119271 | A1 * | 5/2007 | Knopik | G01B 5/0025 73/865.2 |
| 2008/0072444 | A1 * | 3/2008 | Harrill | G01B 11/002 33/600 |
| 2011/0162221 | A1 * | 7/2011 | Knoke | G01B 11/24 33/228 |
| 2012/0328381 | A1 * | 12/2012 | Schmidt | G01B 11/026 408/1 R |
| 2013/0139396 | A1 * | 6/2013 | Knoke | G01B 11/27 33/228 |
| 2013/0200264 | A1 * | 8/2013 | Warkotsch | G01M 17/04 250/341.8 |
| 2015/0354950 | A1 * | 12/2015 | Nihei | B21J 15/28 702/167 |
| 2019/0018234 | A1 * | 1/2019 | Taylor | G02B 27/126 |

* cited by examiner

VEHICLE AND TRAILER FRAME MEASURING SYSTEM

PRIORITY

This application claims the priority benefit of U.S. Provisional Application No. 62/927,643, filed on Oct. 29, 2019, which is hereby incorporated herein by reference in its entirety.

FIELD

This disclosure relates generally to the field of laser measurement, and more particularly to laser measurement of a vehicle, and more particularly still to a laser measurement system and method for evaluating a frame of a heavy duty truck or trailer without the need for a vehicle frame specifications database.

BACKGROUND

It is often necessary to inspect, and if necessary, straighten the frame of a vehicle or a trailer that has been damaged such as often occurs in a crash. Due to the many varied shapes, sizes and configurations of vehicle frames, especially for heavy duty trucks and trailers, it can be difficult to determine whether a vehicle's frame has been bent from an original configuration.

Conventional techniques for measuring frames require a database containing x,y,z coordinates and point properties for every vehicle to be measured. The measurement systems use these properties to assist with scanner orientation. Then measurements are taken with the laser scanner. After the measurement process is complete, the system displays the measured error from the known database points. Frame data is available from several data suppliers for cars and light duty trucks. However, such data is usually not available for heavy duty trucks and for trailers hauled by these trucks.

It is not feasible to create a database of frame data for heavy duty trucks and trailers because there are too many different configurations to measure all variants, and manufacturer-supplied data is not available. Because of this and technical problems with accurate measurements over the length of these vehicles there has never been a system capable of accurately measuring frames of heavy duty vehicles or their trailers.

Therefore, there is an ongoing need to provide a frame measurement method and system that does not require a vehicle database in order to operate.

SUMMARY

The present invention addresses the drawbacks and weaknesses of the prior art by providing a measurement system for frames of heavy duty trucks and trailers that does not need a dimensional reference database. A simple frame drawing is created in the measurement system. A plurality of electronic targets are attached to selected target points on the frame. A position of the laser scanner from the selected target points is determined. Measurement data for additional targets is determined. The frame dimensions are then analyzed for defects that are greater than a pre-set tolerance. Measurements outside of the tolerance range can be flagged with contrasting color. The results of the frame analysis are shown on the user's screen, on the electronic target, and can be printed out or emailed for future inspection. The frame is repaired while the targets and laser scanner are still deployed so that the measurement system can continue to display the status of the measurement points in real time and the success of the repairs can be confirmed.

The disclosure includes a system for measuring a frame of a vehicle or a trailer. The system in certain examples can include a computer disposed on a cart, a laser scanner communicatively coupled to the computer, a plurality of targets for the laser scanner, and a torque box assembly that is configured to attach to the frame.

A plurality of different length stems that connect the plurality of targets to the frame or the torque box can be provided. A plurality of mechanical adapters that connect the plurality of targets to the frame or the torque box can be provided. A plurality of magnetic connectors that connect the plurality of targets to the frame or the torque box can be provided. A C-stem that connects the plurality of targets to the frame or the torque box can be provided.

The torque box assembly can comprise a pair of spaced apart and longitudinally elongated rails that are aligned parallel to one another, a pair of adaptor blocks, each one disposed at a longitudinal end of the pair of spaced apart and longitudinally elongated rails, a vertical magnet block disposed at a longitudinal mid-point of the rails that is aligned perpendicular to the longitudinal elongation of the rails, and a horizontal magnet block disposed adjacent to the vertical magnet block. Each of the pair of adaptor blocks, the vertical magnet block and the horizontal magnet block can be disposed between the pair of spaced apart and longitudinally elongated rails.

A magnetic adapter can be secured to each of the adaptor blocks. A first magnetic jig can be disposed in the vertical magnet block and a second magnetic jig disposed in the horizontal magnet block. A third magnetic jig can be disposed in the vertical magnet block.

The disclosure also includes a torque box assembly for a vehicle and trailer frame measuring system. The torque box assembly in certain examples can include a pair of spaced apart and longitudinally elongated rails that are aligned parallel to one another, a first adaptor block disposed at a first longitudinal end of the pair of spaced apart and longitudinally elongated rails, a second adaptor block disposed at a second longitudinal end of the pair of spaced apart and longitudinally elongated rails, a vertical magnet block disposed at a longitudinal mid-point of the rails that is aligned perpendicular to the longitudinal elongation of the rails, and a horizontal magnet block disposed adjacent to the vertical magnet block. Each of the first adaptor block, the second adaptor block, the vertical magnet block and the horizontal magnet block are disposed between the pair of spaced apart and longitudinally elongated rails.

A first magnetic adapter secured to the first adaptor block. A first magnetic jig can be disposed in the vertical magnet block and a second magnetic jig disposed in the horizontal magnet block. A third magnetic jig can be disposed in the vertical magnet block.

The disclosure still further includes a method of measuring vehicle or trailer frames. The method in certain examples can include attaching a first torque box to the vehicle or trailer frame, attaching a second torque box to the vehicle or trailer frame spaced apart from the first torque box, attaching a first laser scanning target to a first longitudinal end of the first torque box, attaching a second laser scanning target to a second longitudinal end of the first torque box, attaching a third laser scanning target to a first longitudinal end of the second torque box; and attaching a fourth laser scanning target to a second longitudinal end of the second torque box.

A position of a laser scanner can be triangulated with respect to the vehicle or trailer frame by scanning the first, second, third and fourth targets with the laser scanner and using a measured distance between the front of the vehicle or trailer frame and the first torque box.

A frame width can be determined by scanning with the laser scanner a fifth laser scanning target attached to the vehicle or trailer frame to calculate a centerline of the vehicle or trailer frame.

After orientation of the laser scanner is determined, the method can further include attaching additional laser scanning targets to the vehicle or trailer frame in positions spaced apart from the first torque box and the second torque box, and performing a scan of the additional laser scanning targets with the laser scanner to obtain measurement data.

The measurement data can be evaluated to determine if a frame defect is present. For example, it can be determined whether there is a frame diamond, twist, and width defect with respect to the center of the frame.

The method can further include illustrating the vehicle or trailer frame on a display screen of a computing system that is coupled to the laser scanner, and indicating a warning on the screen of the computing system for any measurements that are outside of a pre-set tolerance range such that the measurements are associated with the frame defect.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Figure 1:
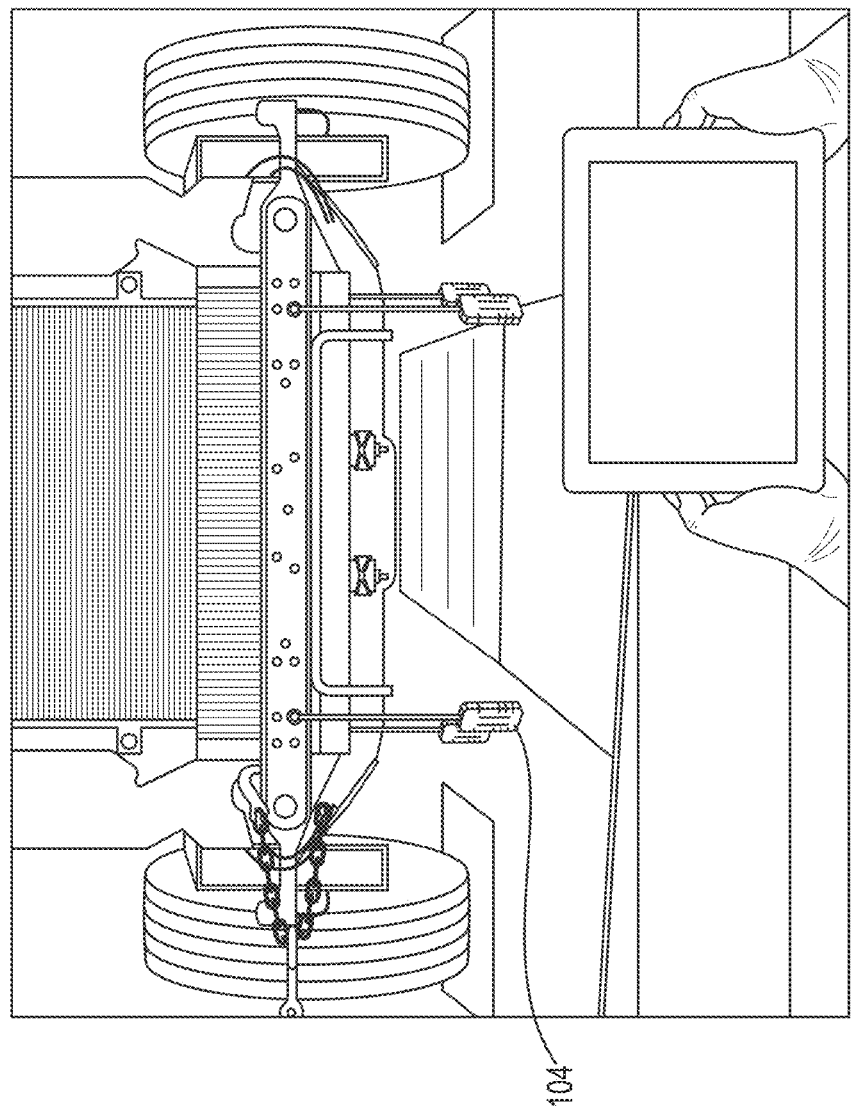
FIG. 1 is a view of electronic targets attached to a vehicle frame in accordance with certain embodiments of the invention.
Figure 2:
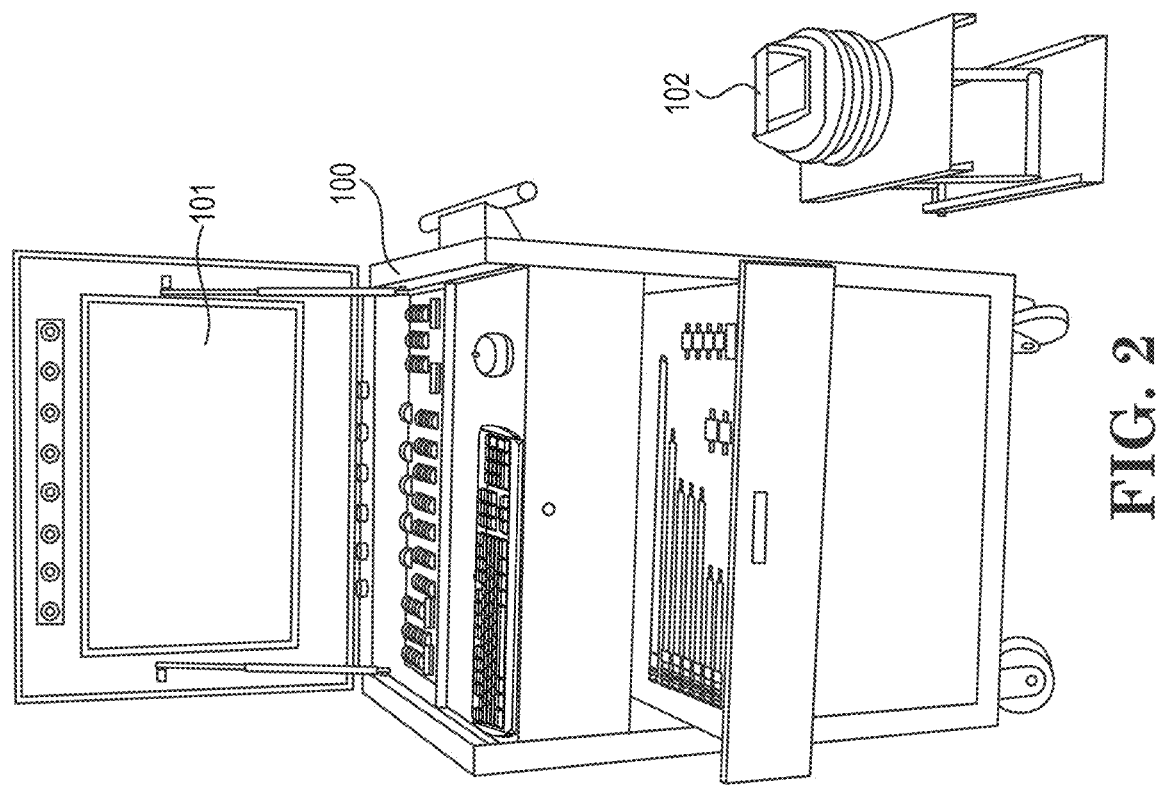
FIG. 2 is a perspective view of components of a vehicle and trailer frame measuring system in accordance with certain embodiments of the invention.
Figure 3:
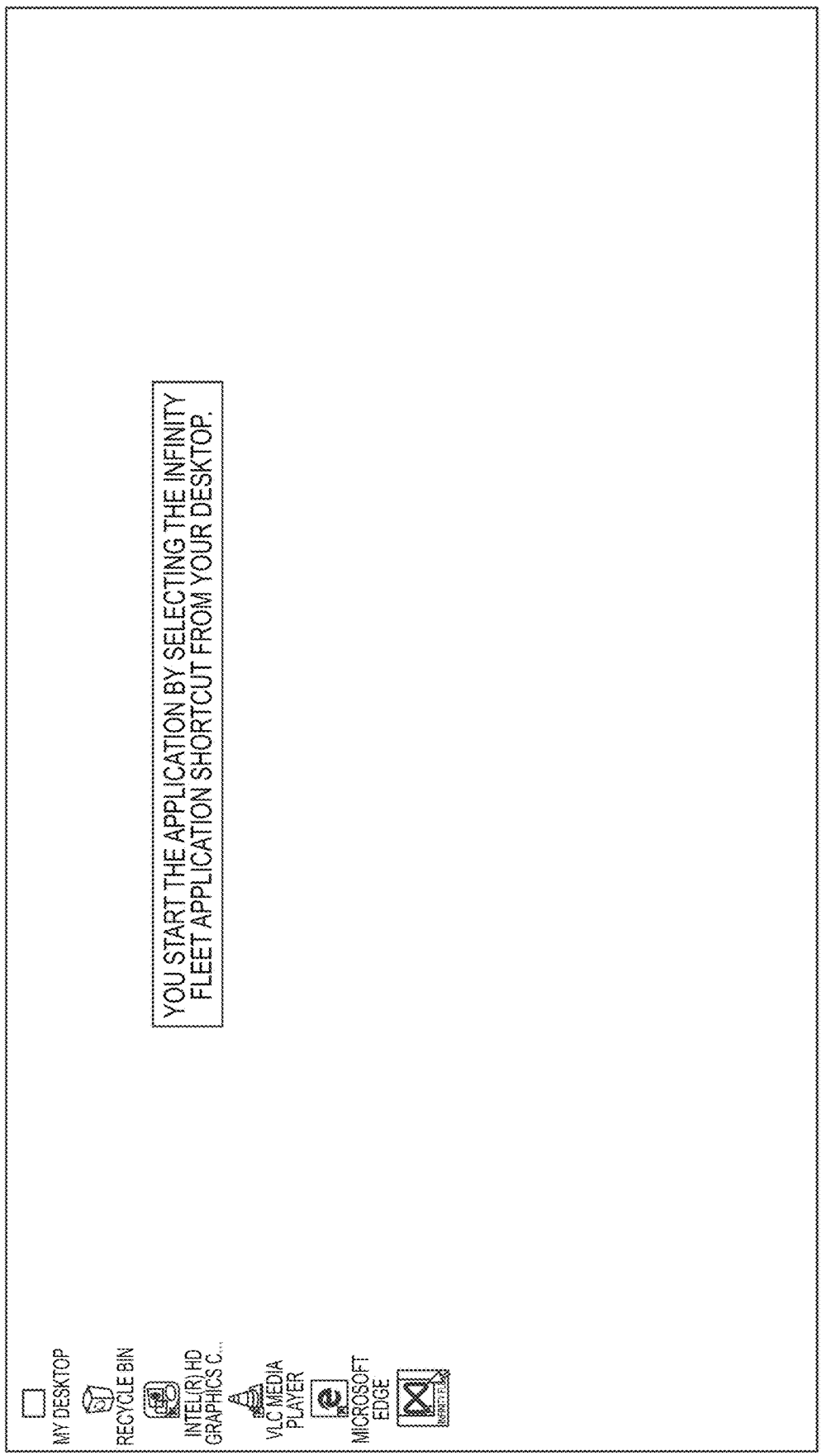
FIGS. 3-17 are slides illustrating and describing aspects and steps of a vehicle and trailer frame measuring system in accordance with certain embodiments of the invention.
Figure 4:
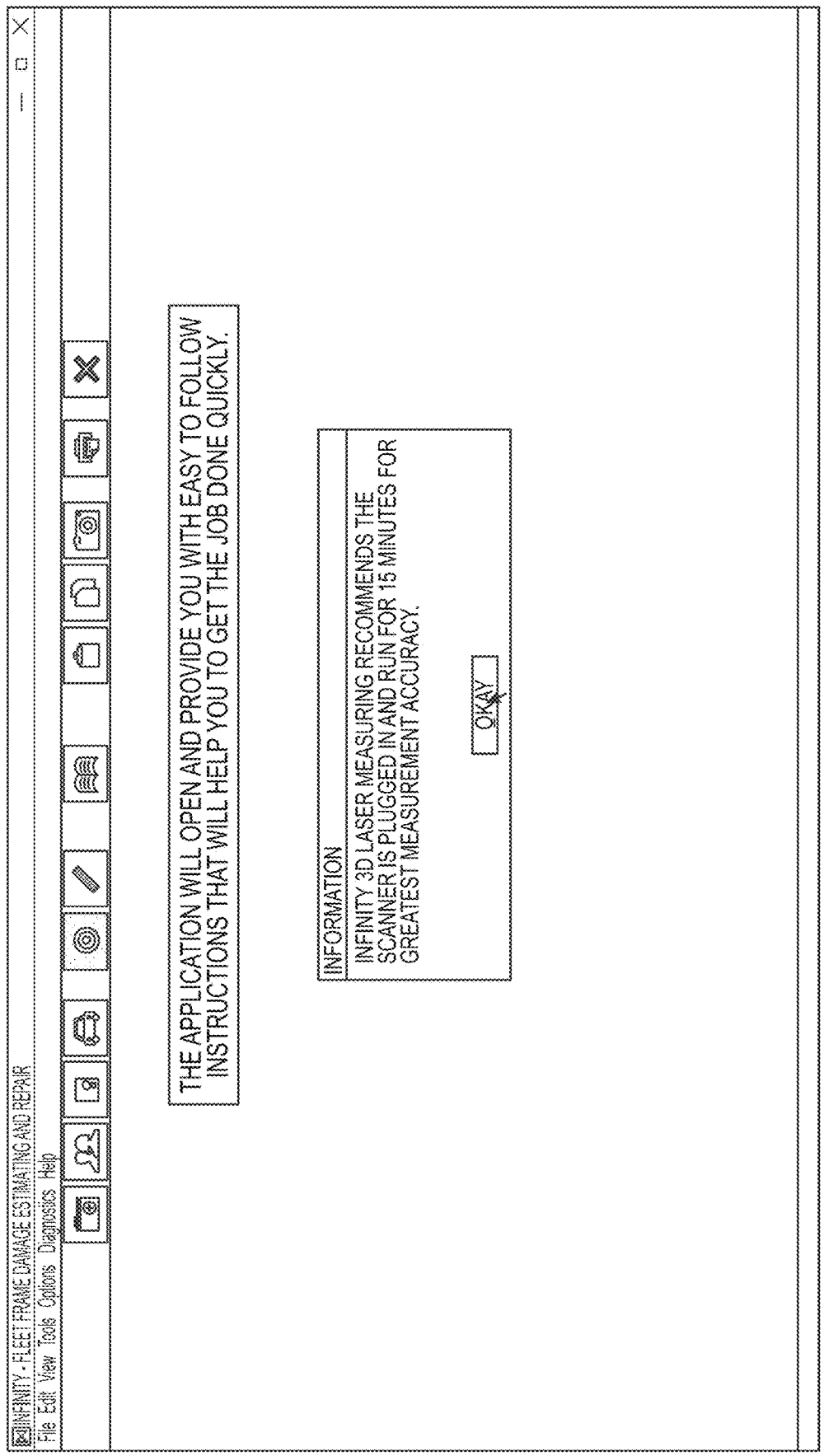
Figure 5:
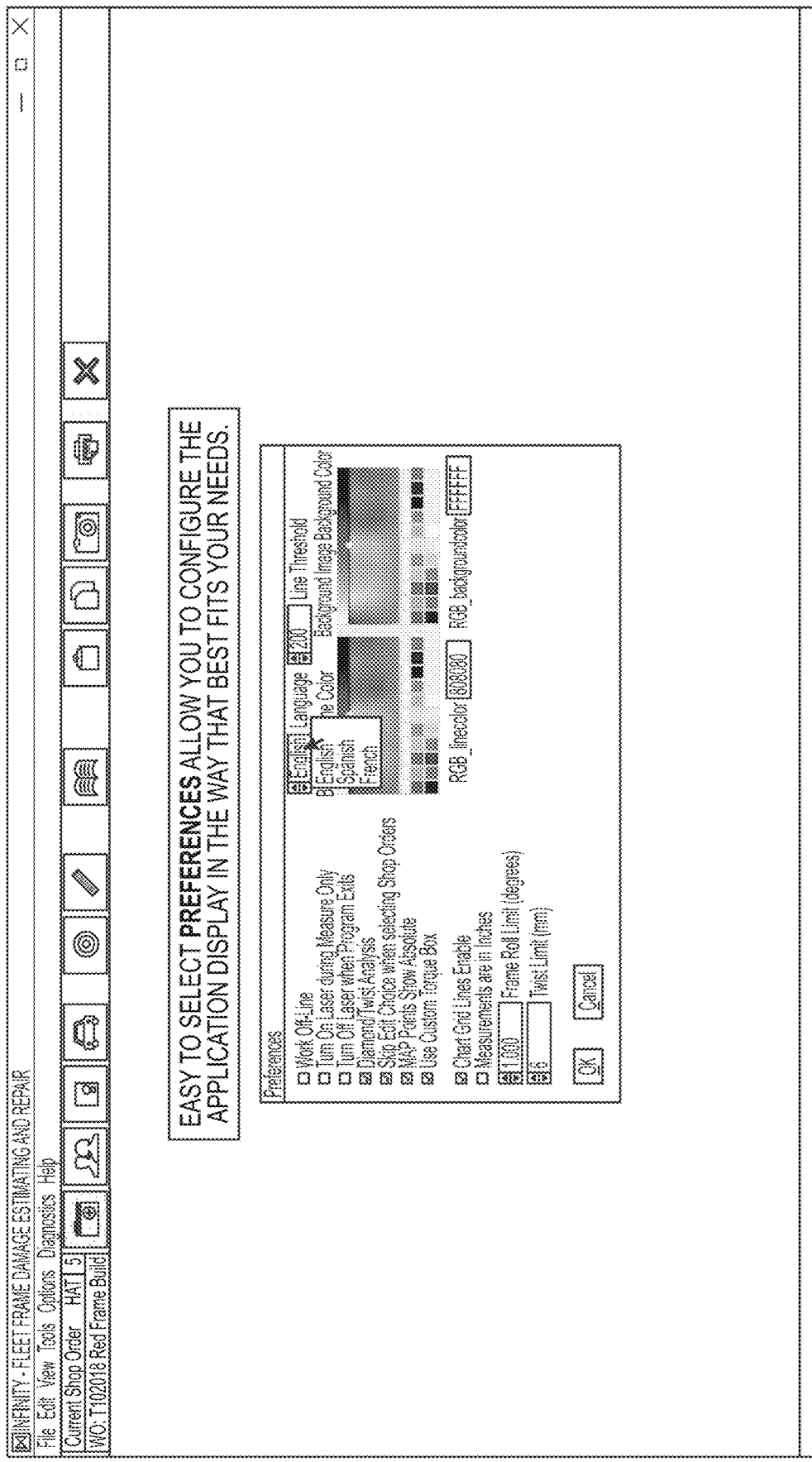
Figure 6:
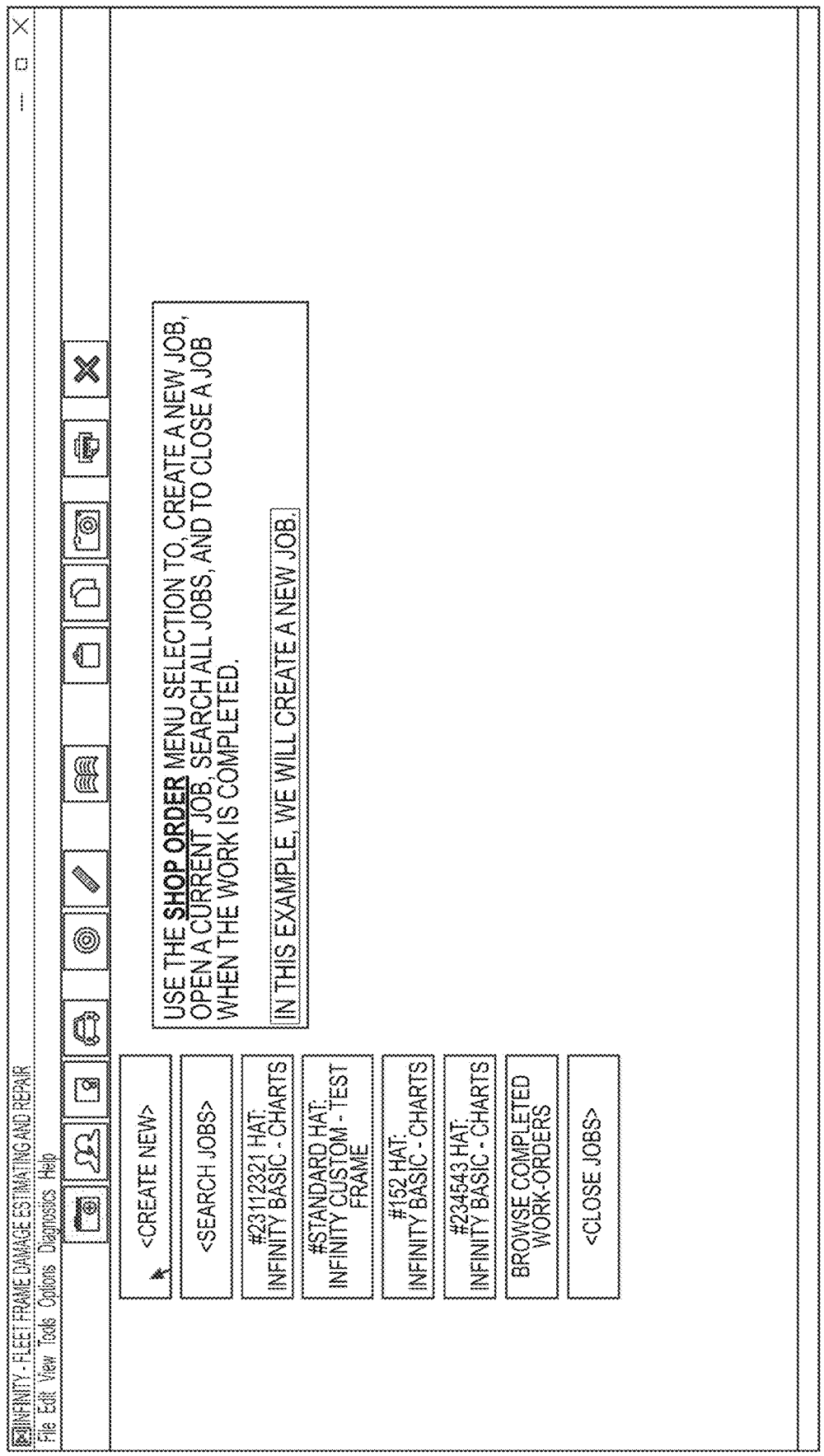
Figure 7:
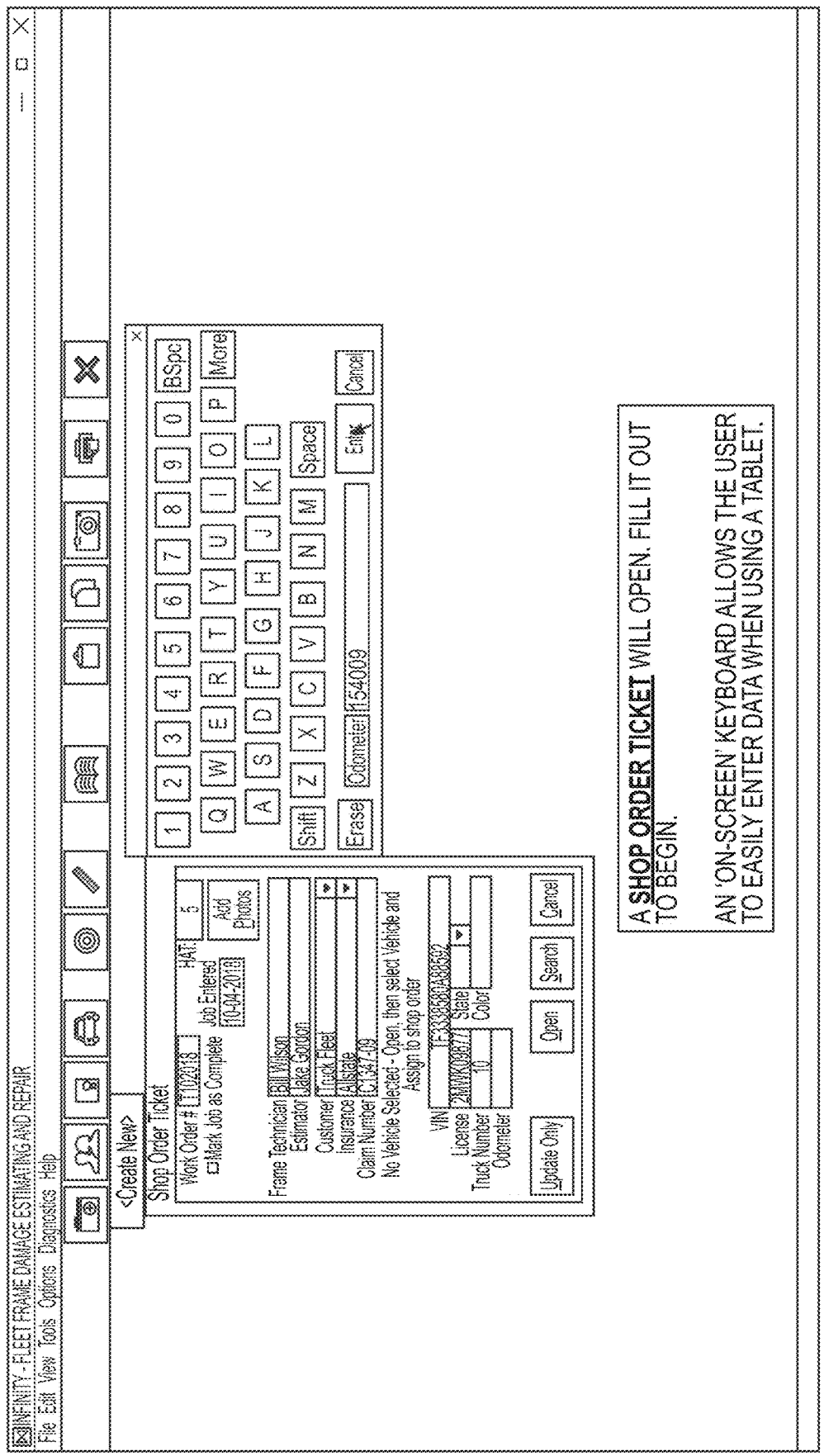
Figure 8:
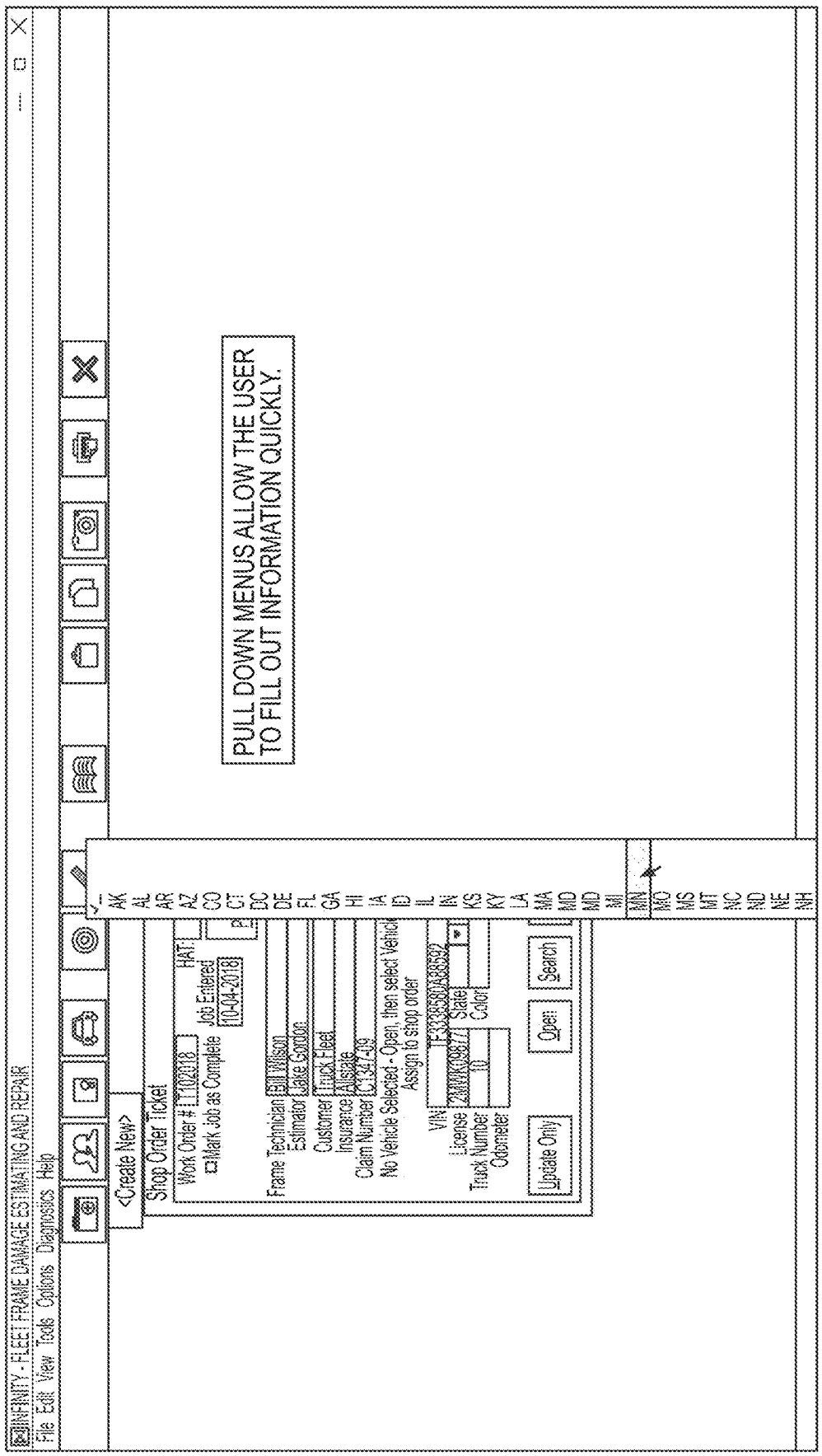
Figure 9:
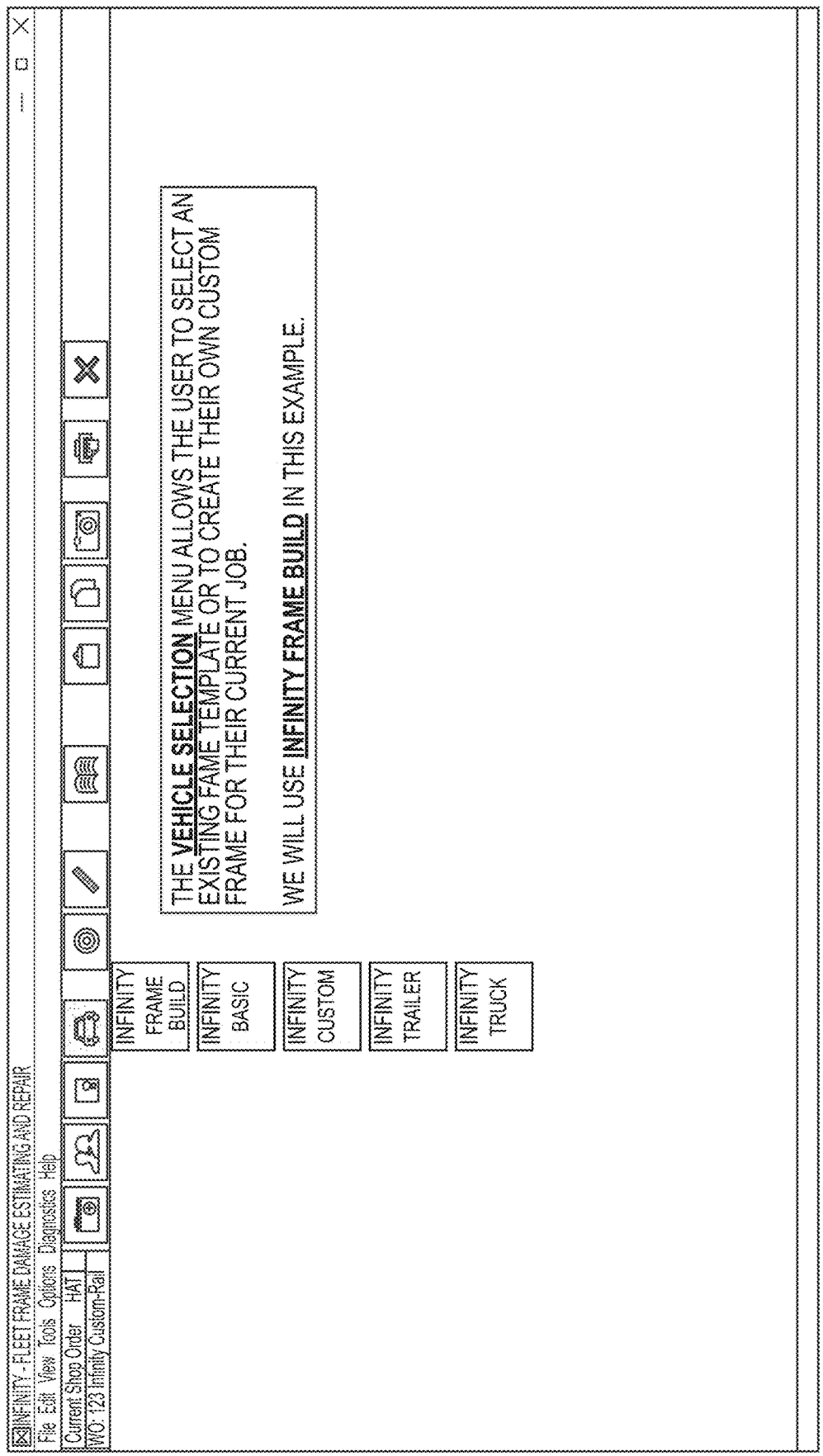
Figure 10:
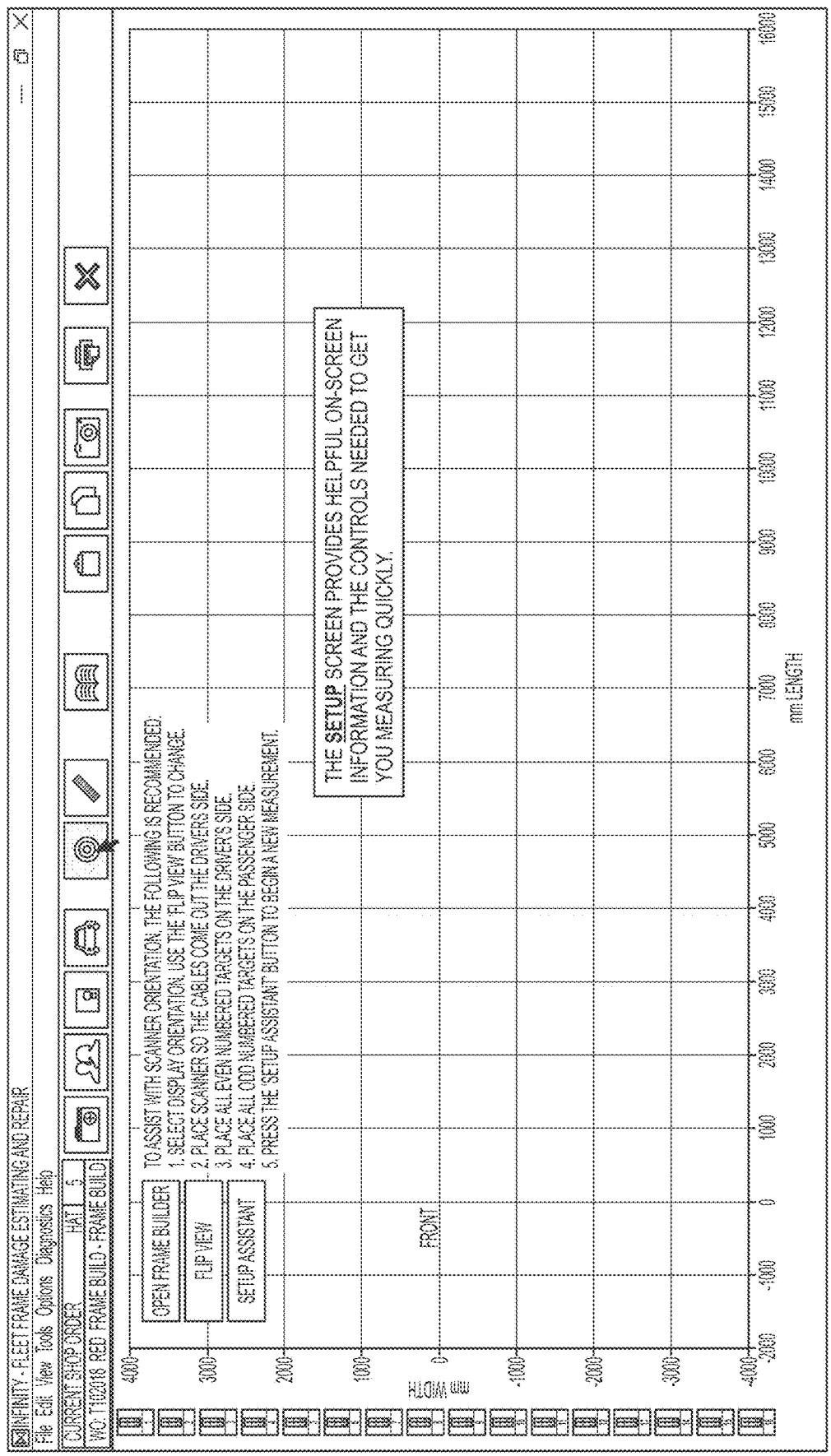
Figure 11:
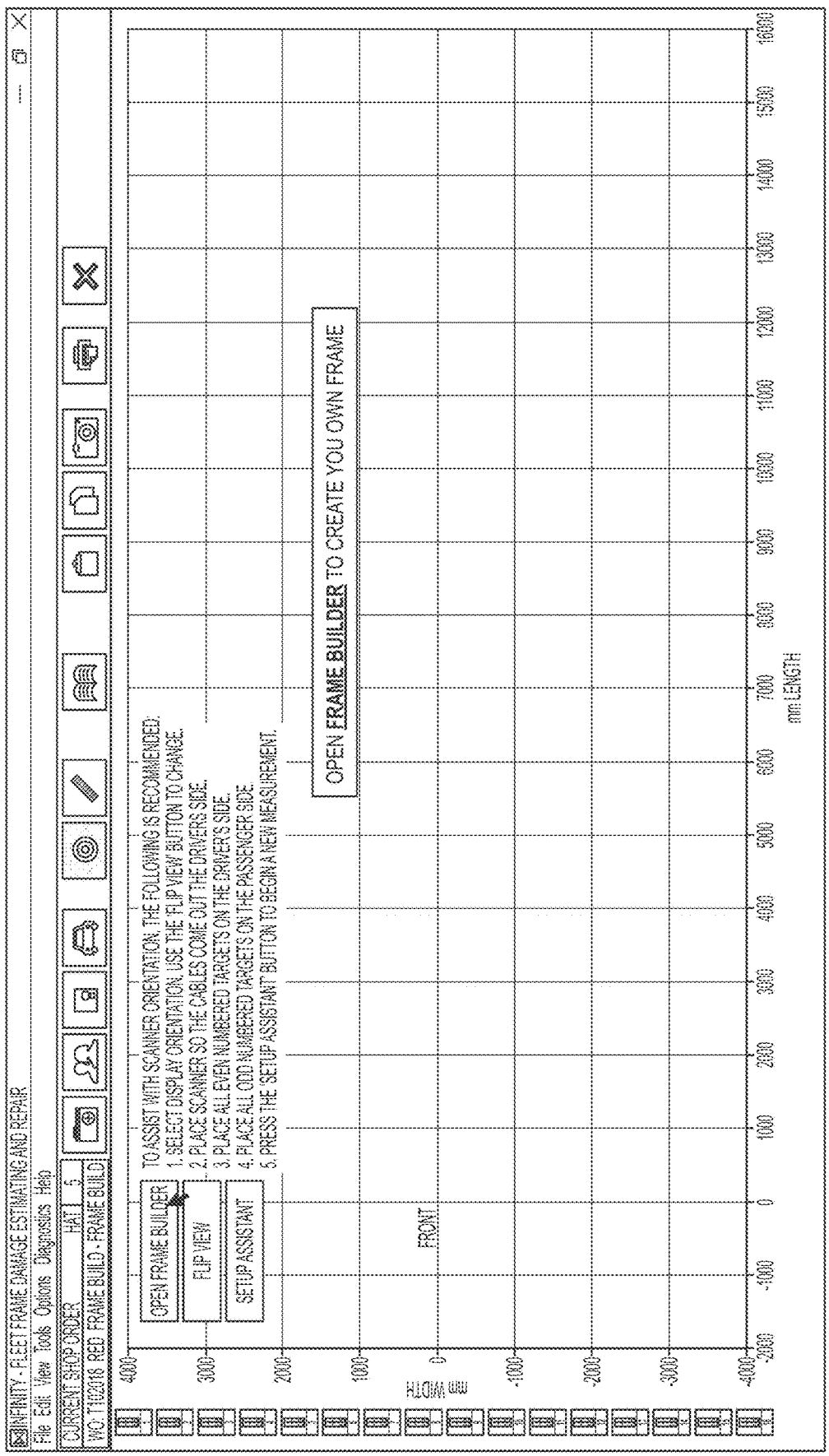
Figure 12:
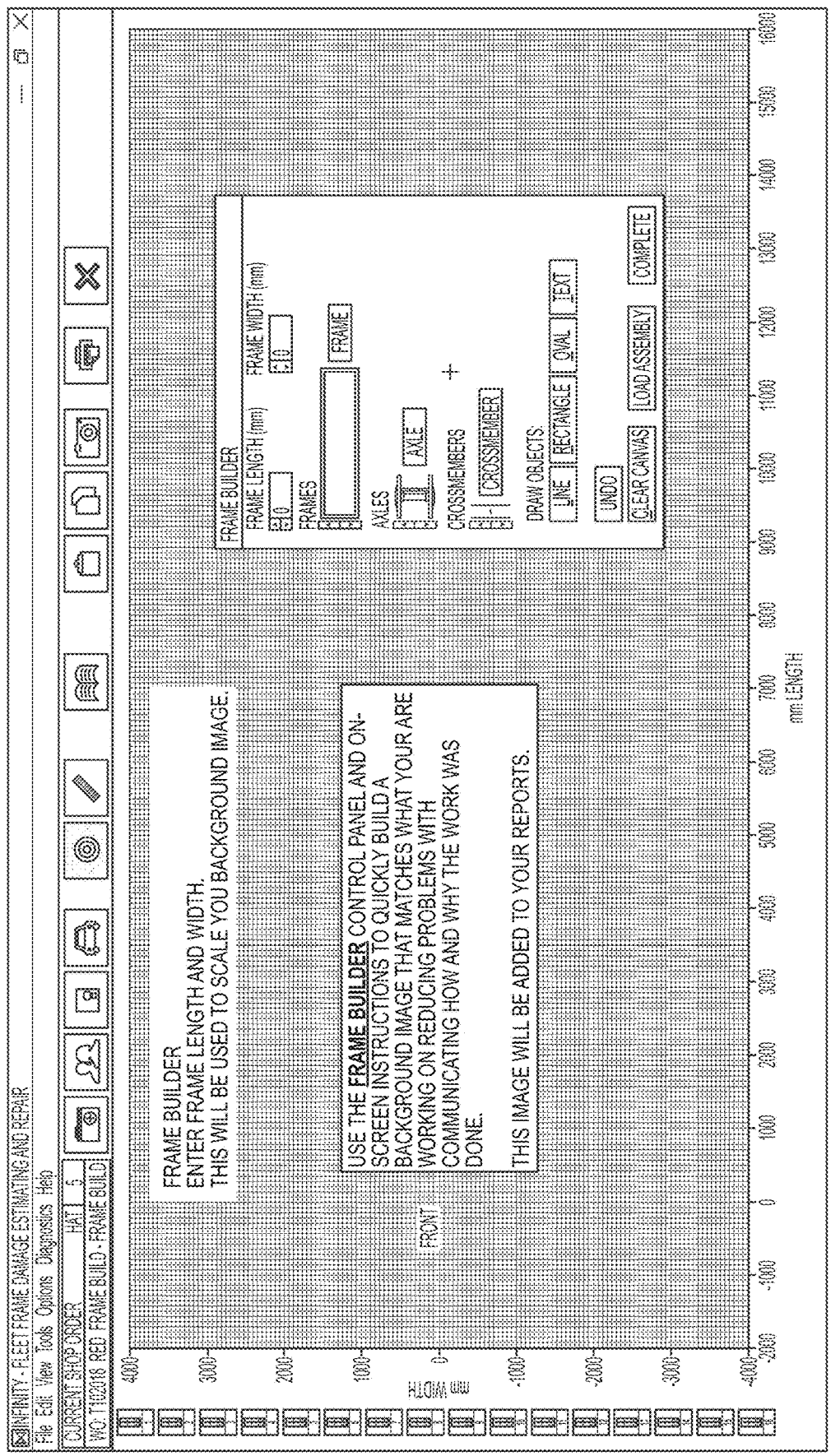
Figure 13:
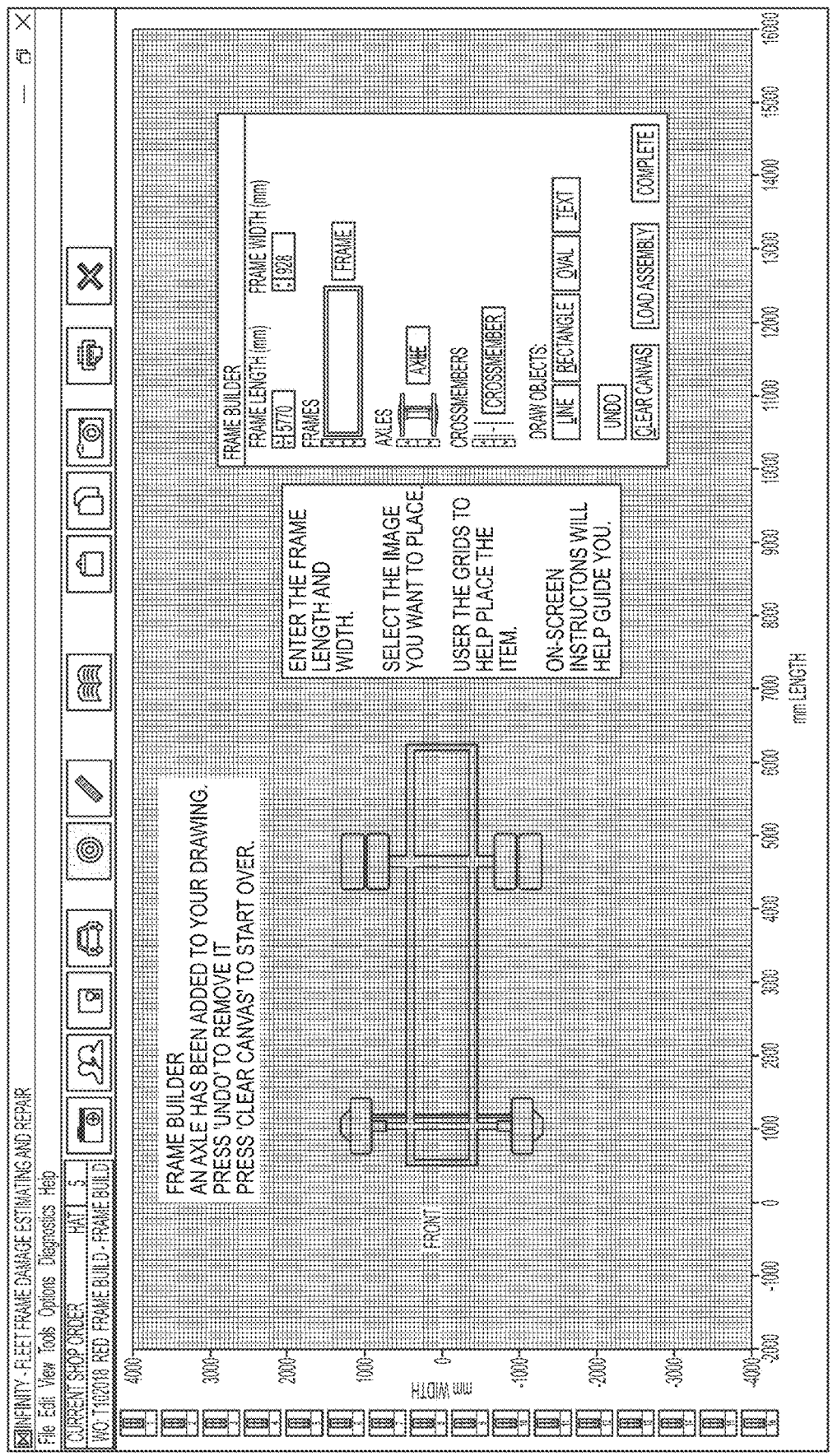
Figure 14:
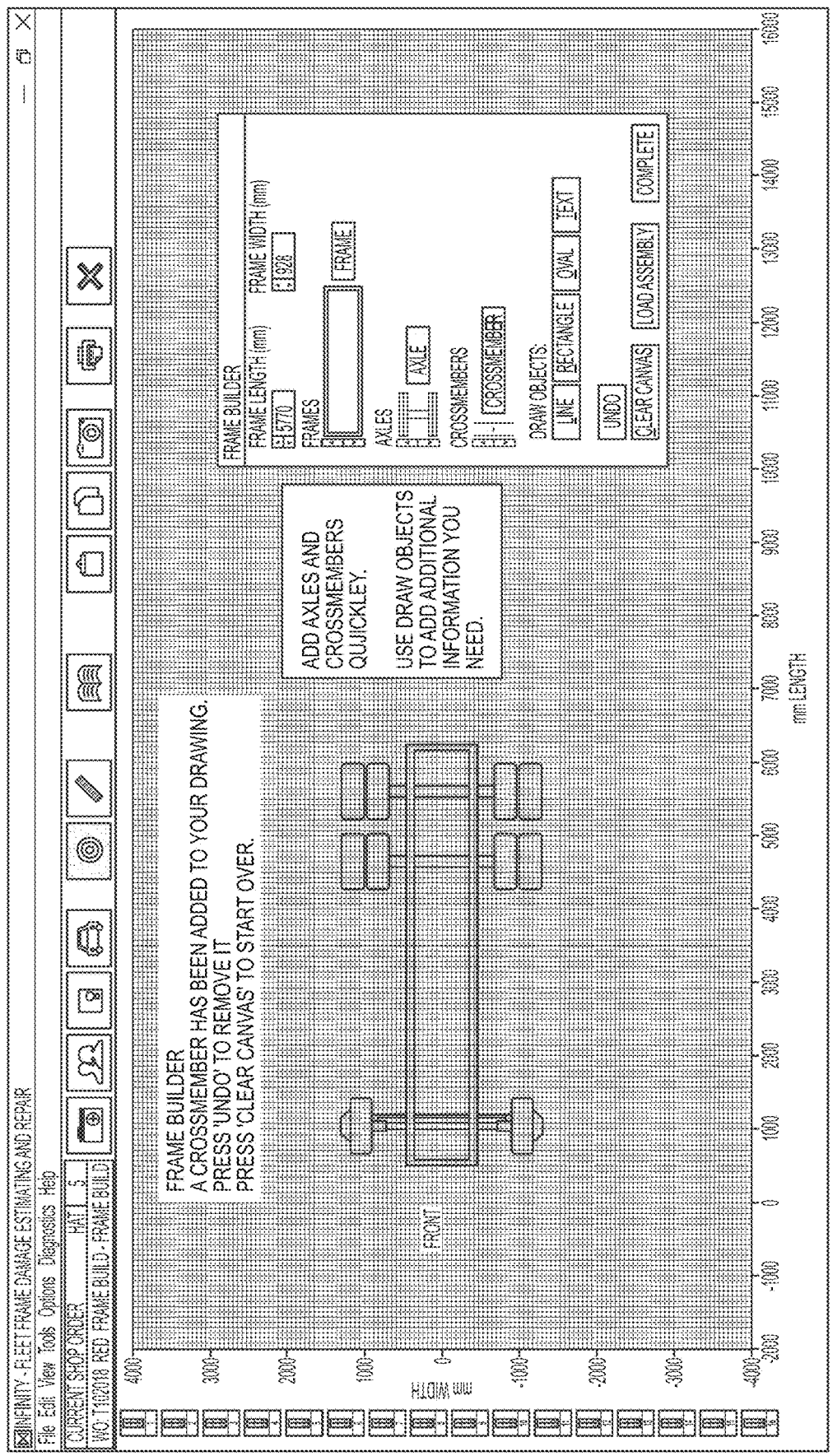
Figure 15:
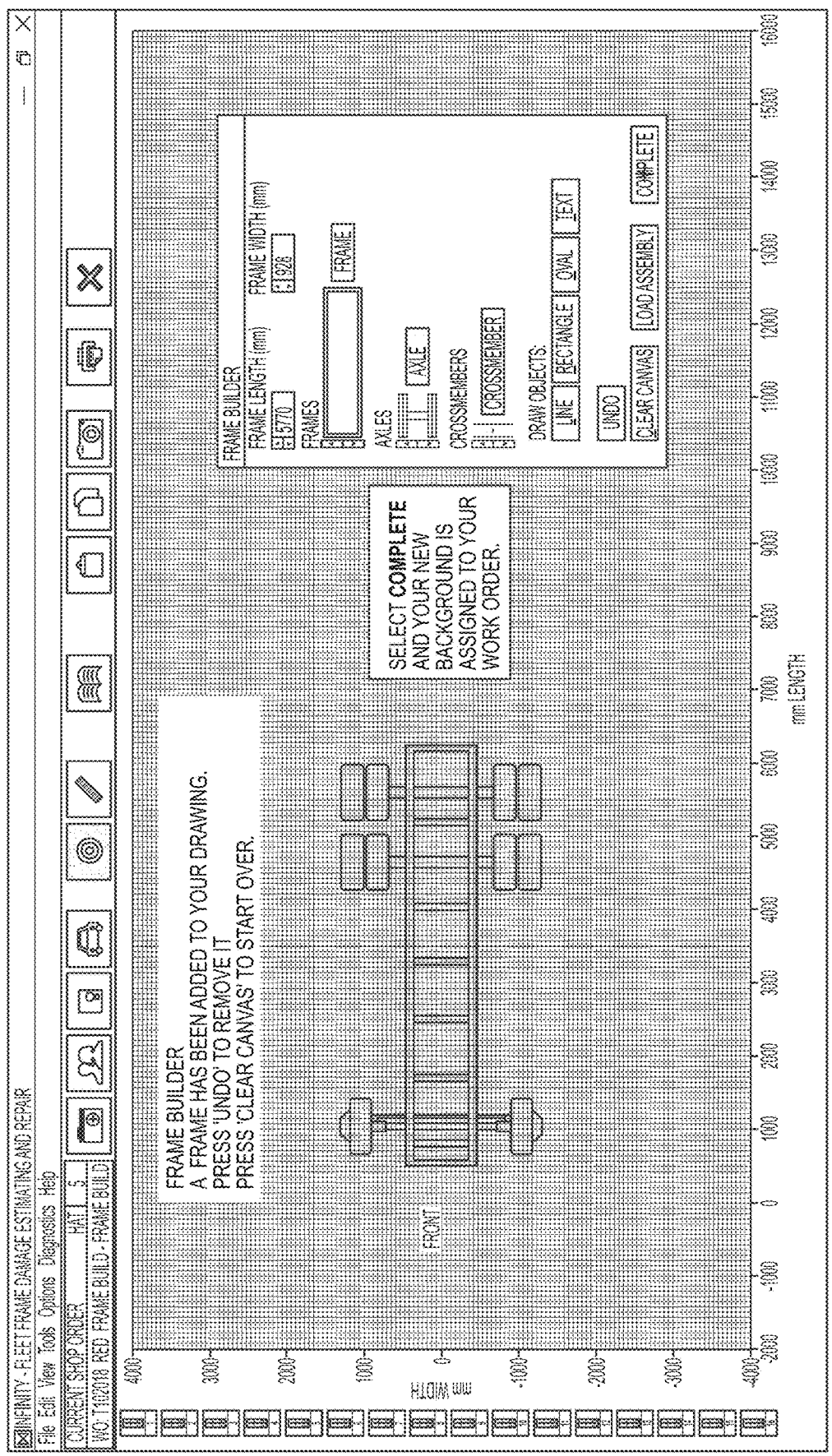
Figure 16:
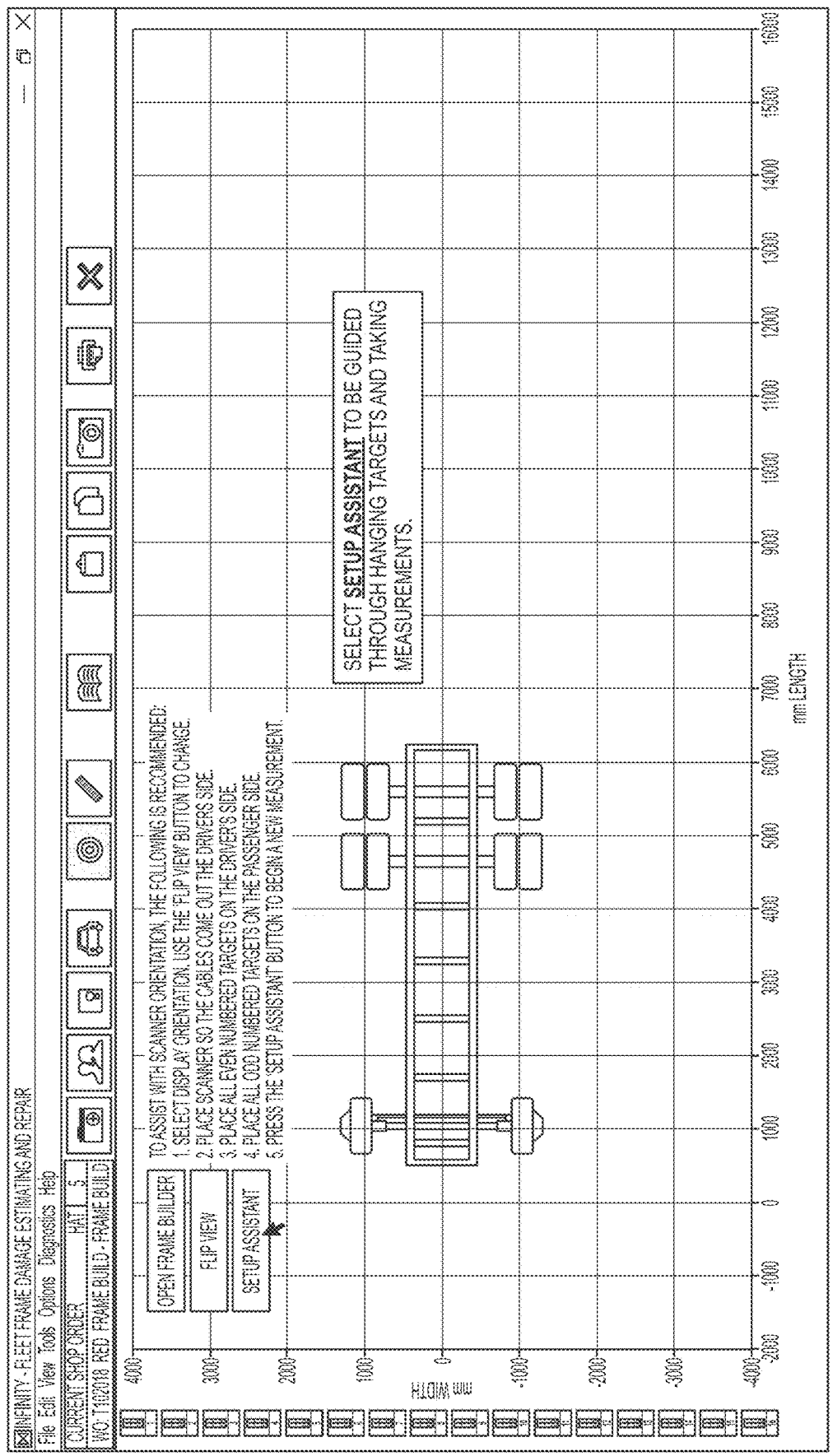

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims.

The various features or aspects discussed herein can also be combined in additional combinations and embodiments, whether or not explicitly discussed herein, without departing from the scope of the invention.

The measurement system provides a method and system to allow a user to orient and measure the frame of a vehicle without reference to predetermined dimensional specifications for the frame. In one example, the user orients to a known reference (referred to as a "torque box") that is attached to the vehicle's frame and digitally applies this reference to a virtual frame created in a computing system. Additional measurement targets are hung on the frame and are displayed virtually with respect to the torque box to allow for relationships between targets to be measured and evaluated. The relationship between the reference targets and the measured targets is used to replace the need of a reference specification of dimensions and allows for common measurement types used to evaluate the condition of the frame to be made by way of automation (system software). This includes methods to evaluate frame diamond, twist, and width with respect to the center of the frame.

The measurement system includes a laser scanner that rotates about a central vertical axis to determine distance to various target assemblies attached to the frame of a vehicle. The laser scanner and targets that can be used with the present measurement system are discussed in U.S. Pat. No. 8,997,361, which is hereby incorporated by reference herein in its entirety.

FIGS. 1-36 explain details of a system and methodology of employing and operating a measurement system using a laser scanner and targets to determine frame measurements without the need for a vehicle database. In particular, the methodology of employing and operating a measurement system is applicable to heavy duty trucks, and trailers for the same.

Referring particularly to FIGS. 1-2, 21 and 37-44, the measurement system comprises a cart 100 including the computer system 101 and other components for the measurement system. A laser scanner 102 is provided to scan targets 104 that are hung from the torque boxes 106, 108 and vehicle frame. A variety of stems and adapters 110 allow the user to hang the targets 104 so that they can be properly scanned by the laser scanner 102.

Figure 17:
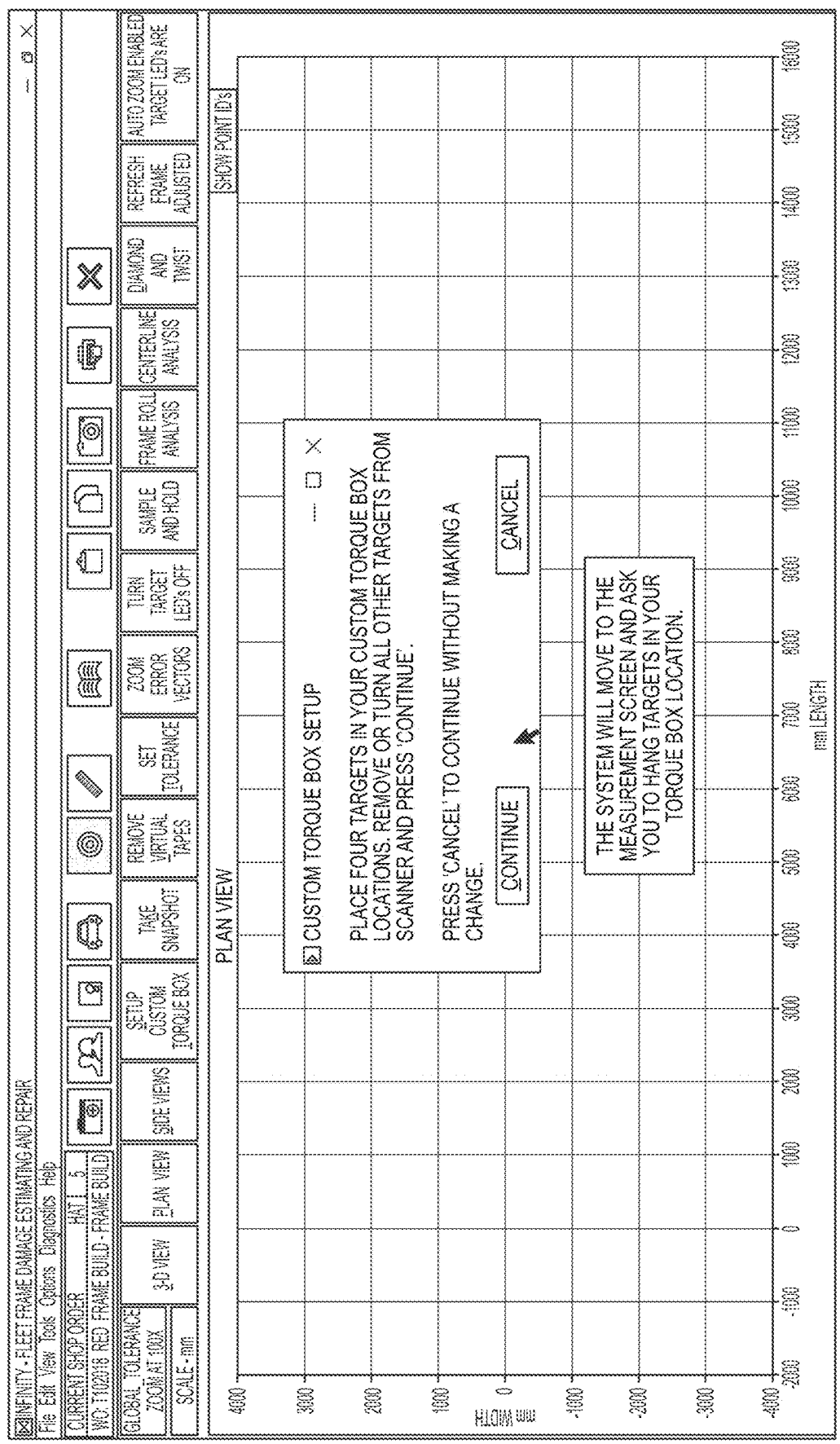
Figure 18A:
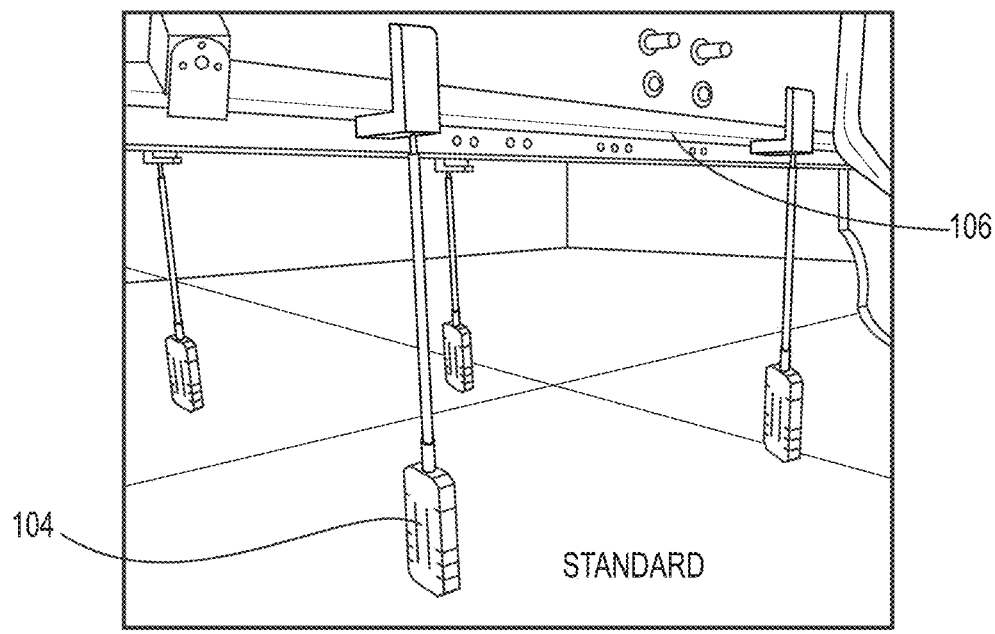
FIGS. 18A and 18B are perspective views of torque boxes attached to a vehicle frame in accordance with certain embodiments of the invention.
Figure 18B:
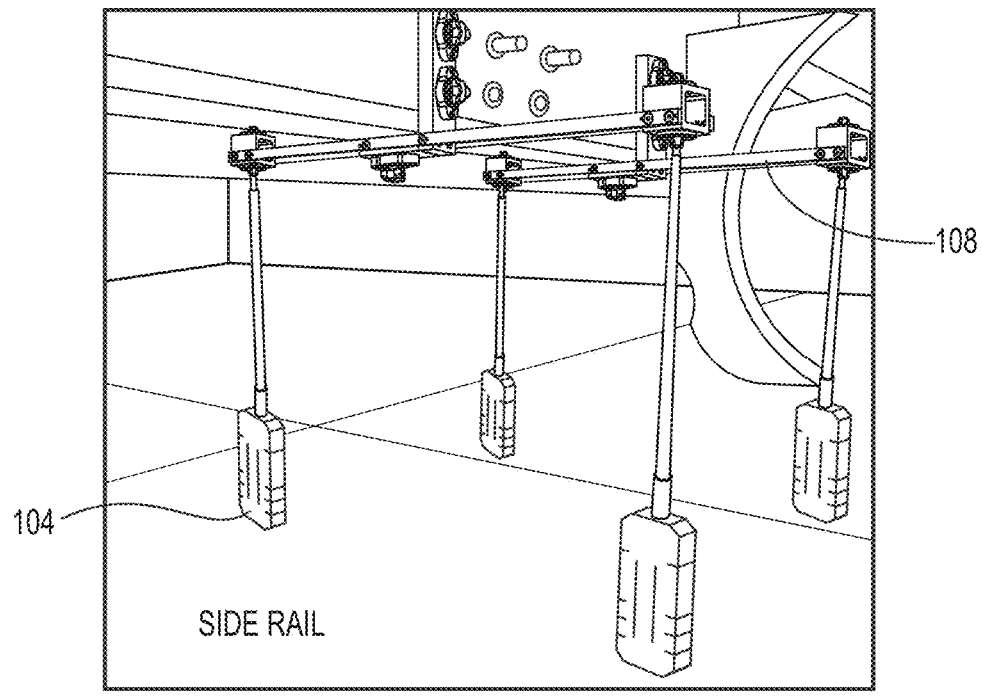
Figure 19:
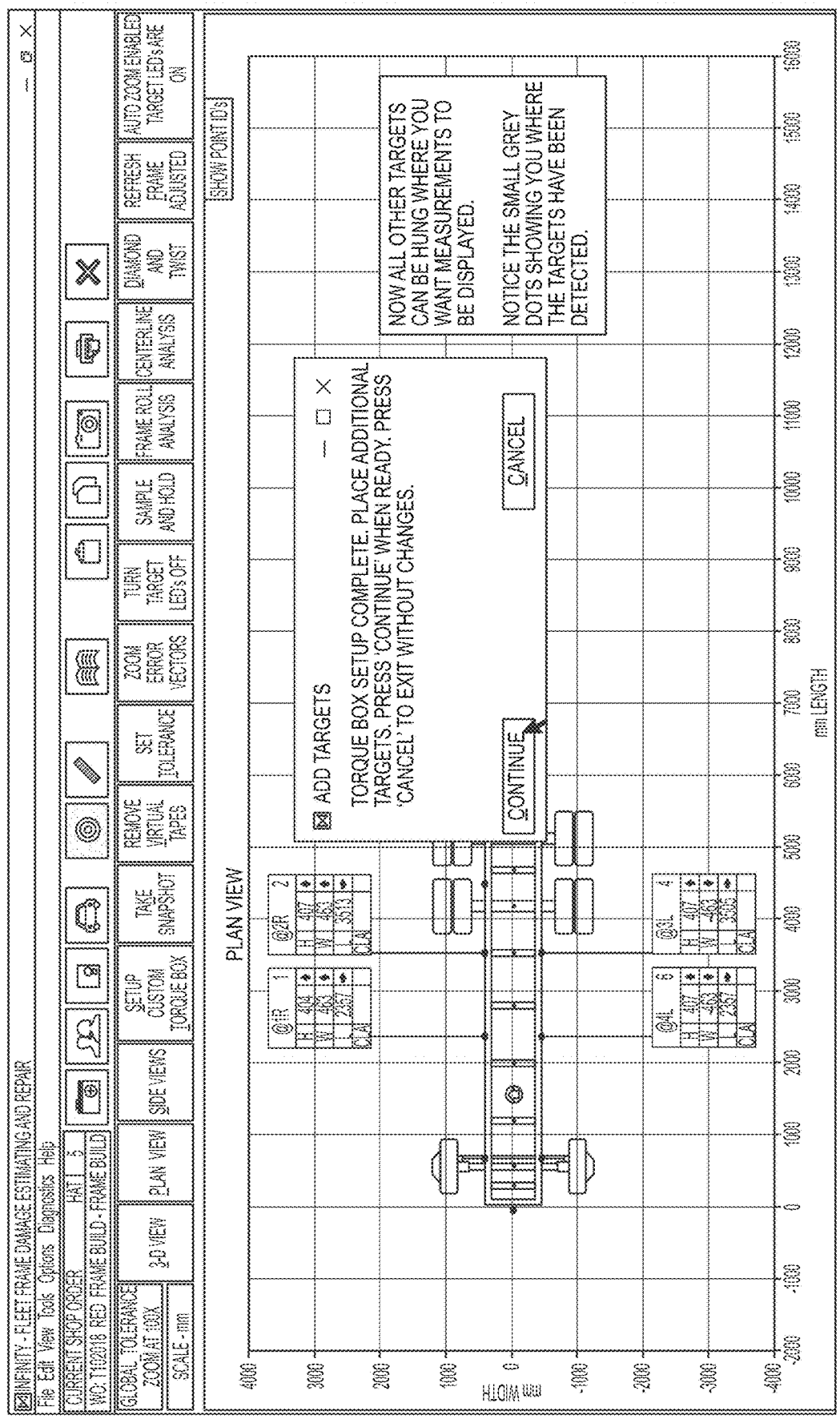
FIGS. 19-20 are slides illustrating and describing aspects and steps of a vehicle and trailer frame measuring system in accordance with certain embodiments of the invention.
Figure 20:
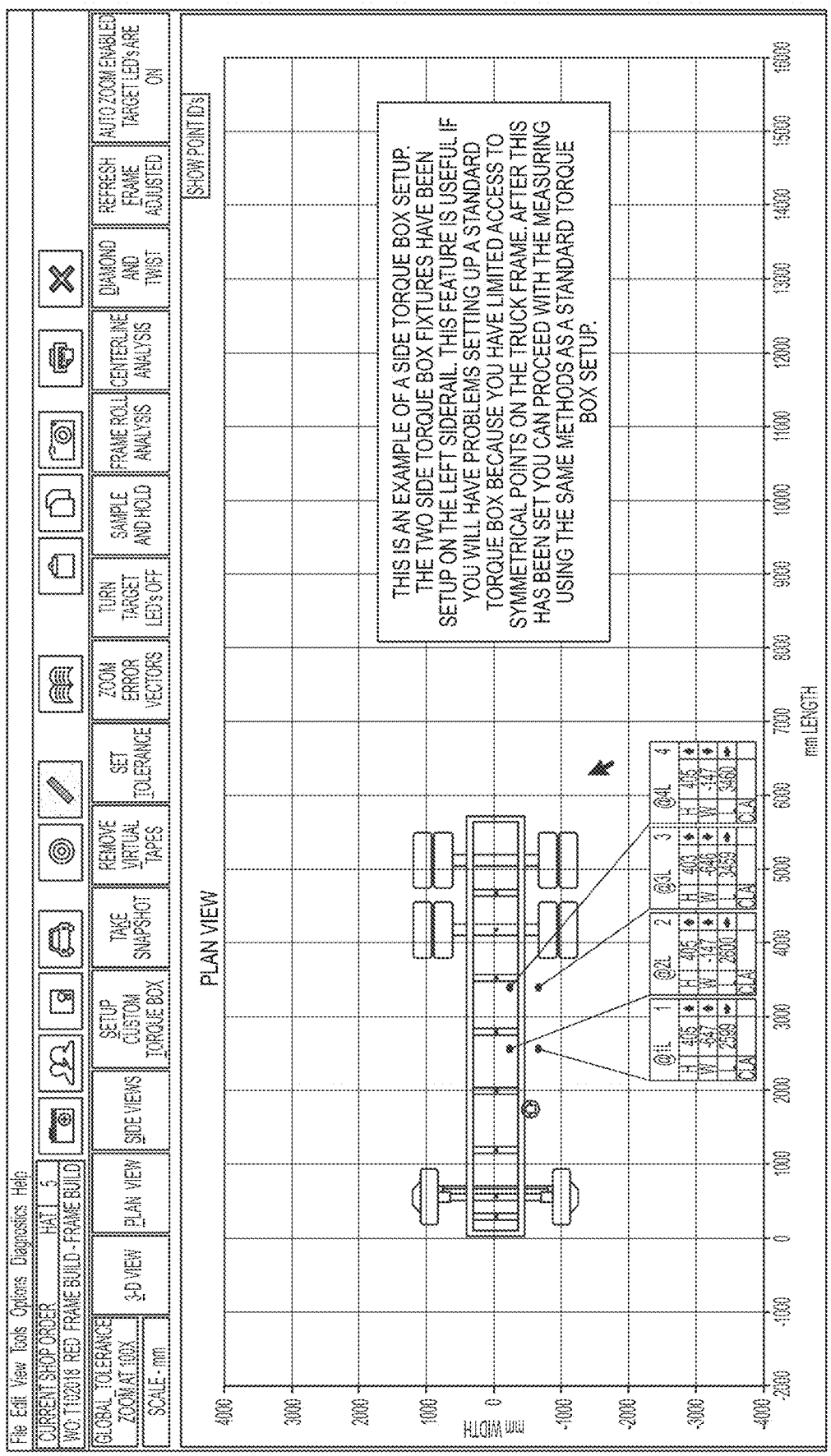

A software program (FIGS. 3-17, 19-20 and 22-36) executes on the computer system to order to illustrate the frame conditions without any factory drawing. The user starts the software application (FIGS. 3-4), is prompted to set preferences (FIG. 5) and begin a new frame evaluation project (FIGS. 6-9). The user then uses frame building tools in the program to sketch a model of the vehicle to be measured and evaluated (FIGS. 10-16). Various configurations and variations of frame size and configuration are easily selected. Upon completion of this step, the drawing can be used to further define the locations of the initial measurement points. The user is then prompted to attach the torque boxes to the vehicle frame (FIG. 17).

Referring now to FIGS. 18A, 18B and 37-39, two variations of attachment of torque boxes 106, 108 are shown. Two electronic targets 104 are attached to each of the torque box assemblies 106, 108. The torque box assemblies 106, 108 are then attached to the frame of the vehicle in either a standard configuration 106 or a side rail configuration 108. The side rail configuration is preferred because the two targets 104 on each torque box assembly 108 are always a known distance apart, whereas defects in the frame could result in a deviation from an assumed spacing in the standard configuration. Therefore, the side rail torque box 108 configuration will be referenced herein below.

Figure 37:
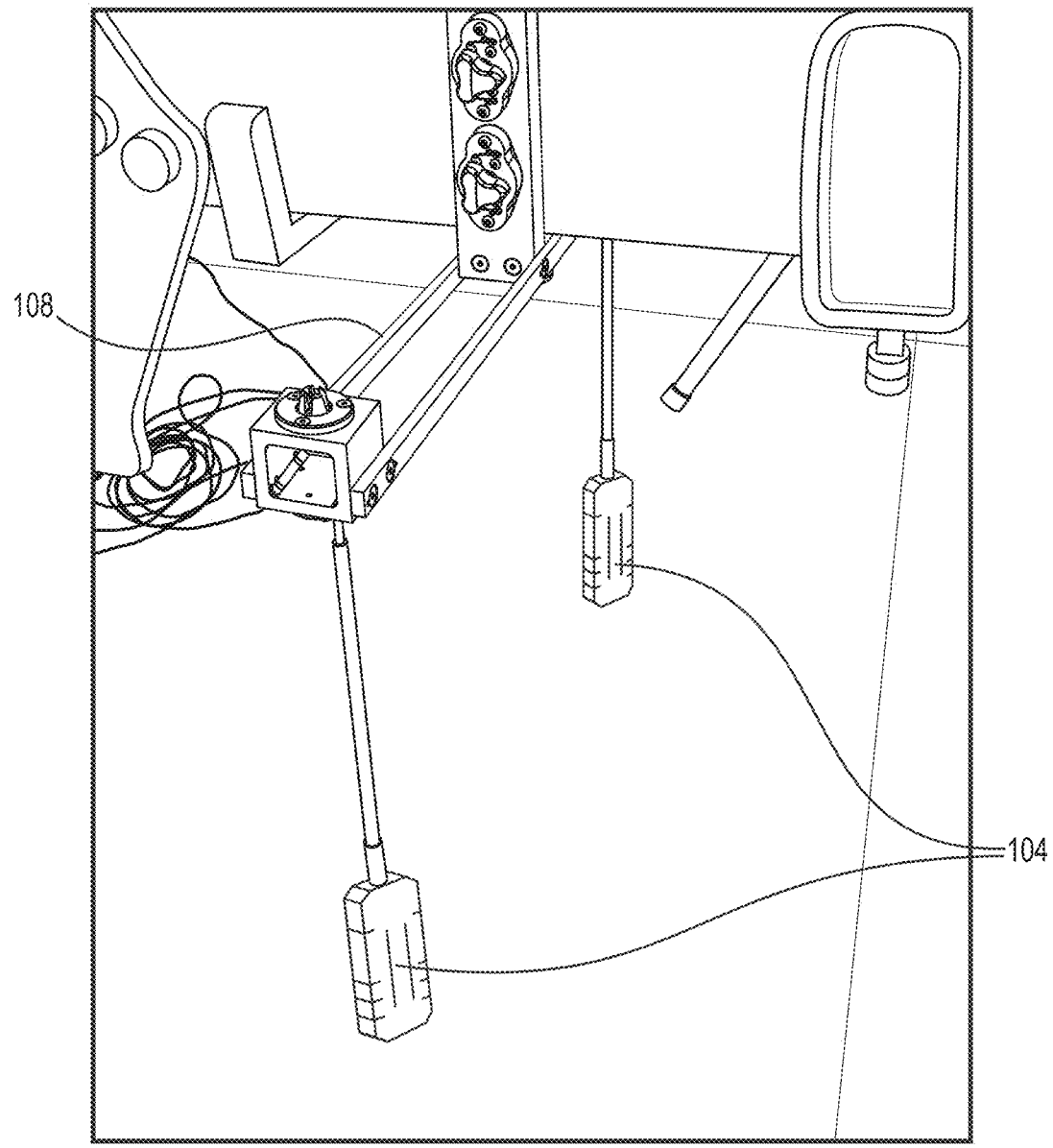
FIGS. 37-39 are photographs showing the torque box coupled to the frame of the vehicle according to certain embodiments of the invention.
Figure 38:
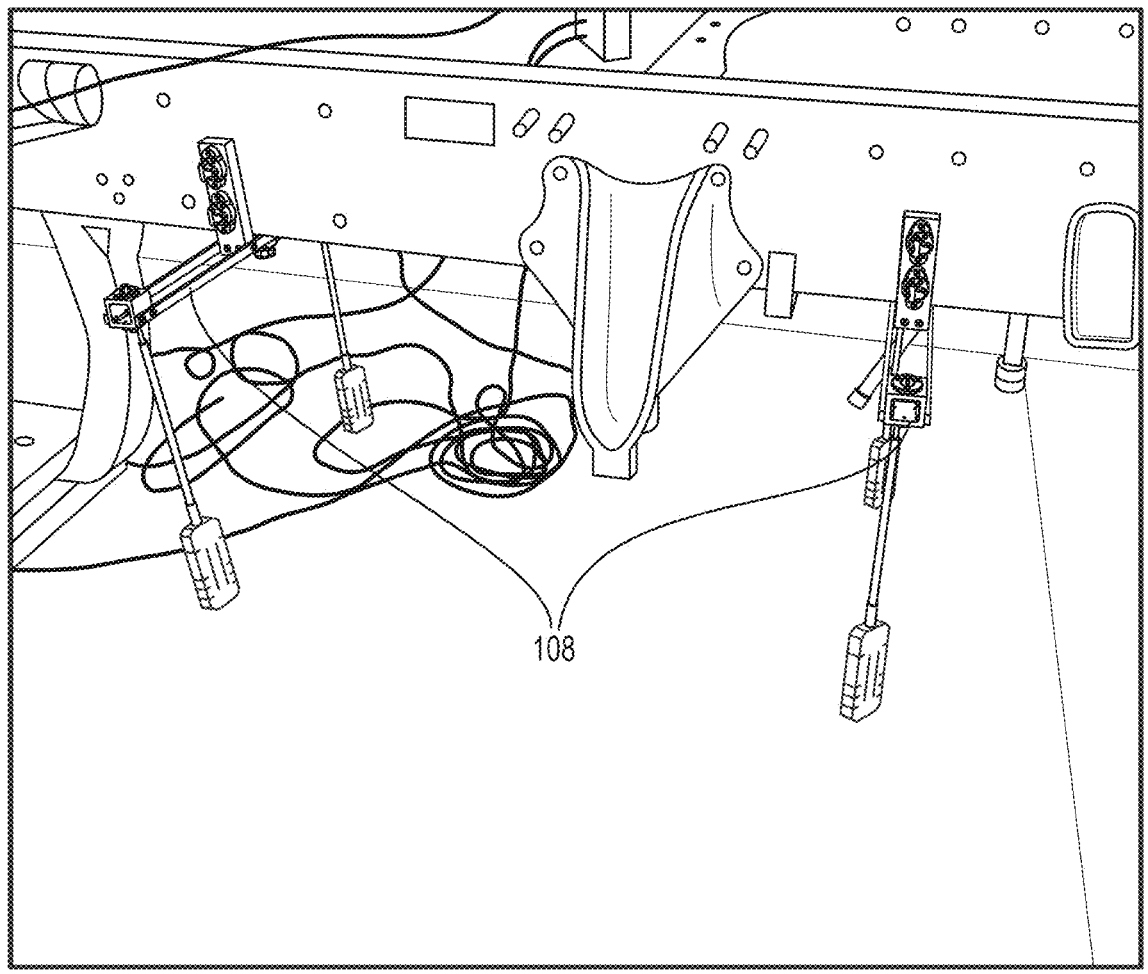
Figure 39:
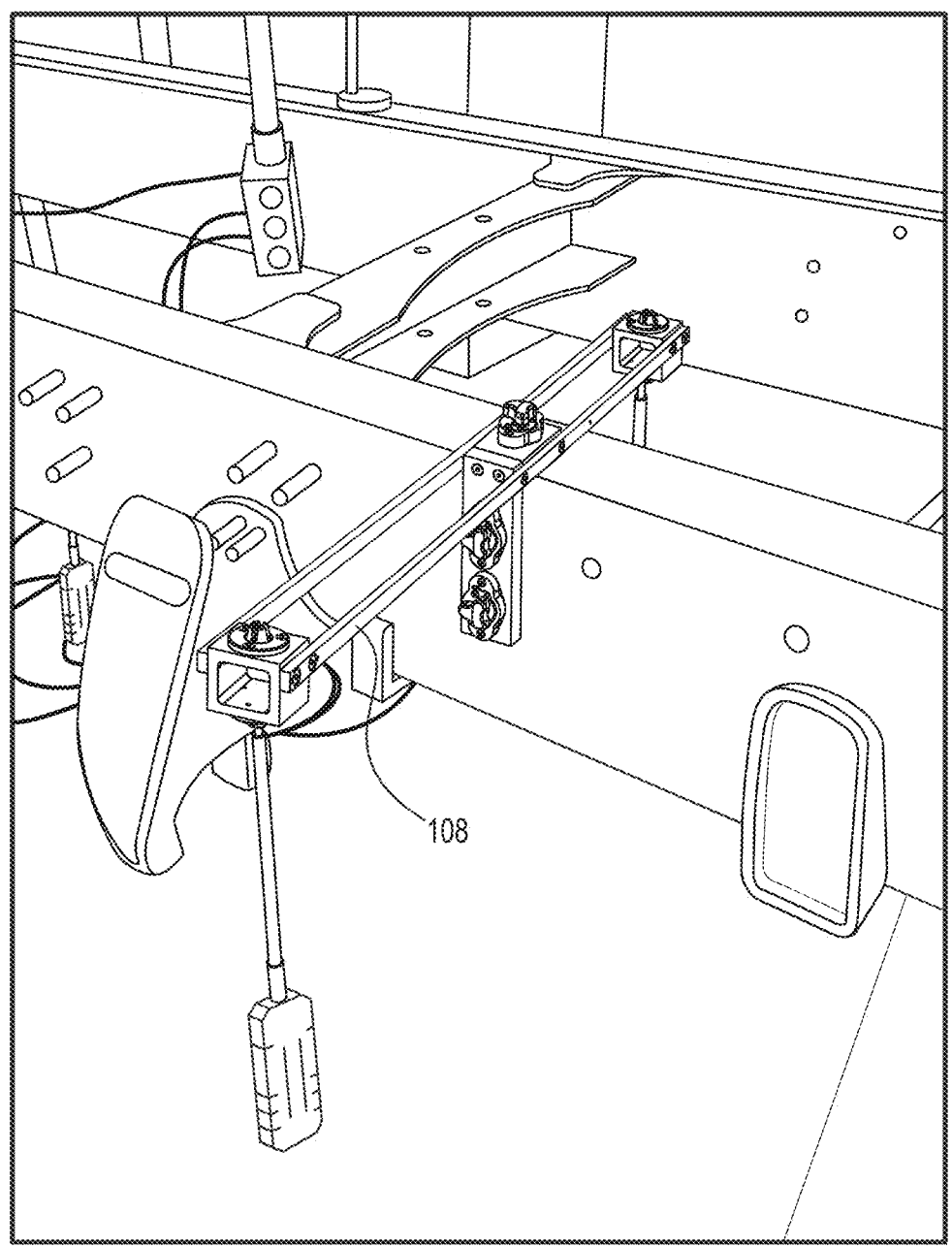
Figure 40:
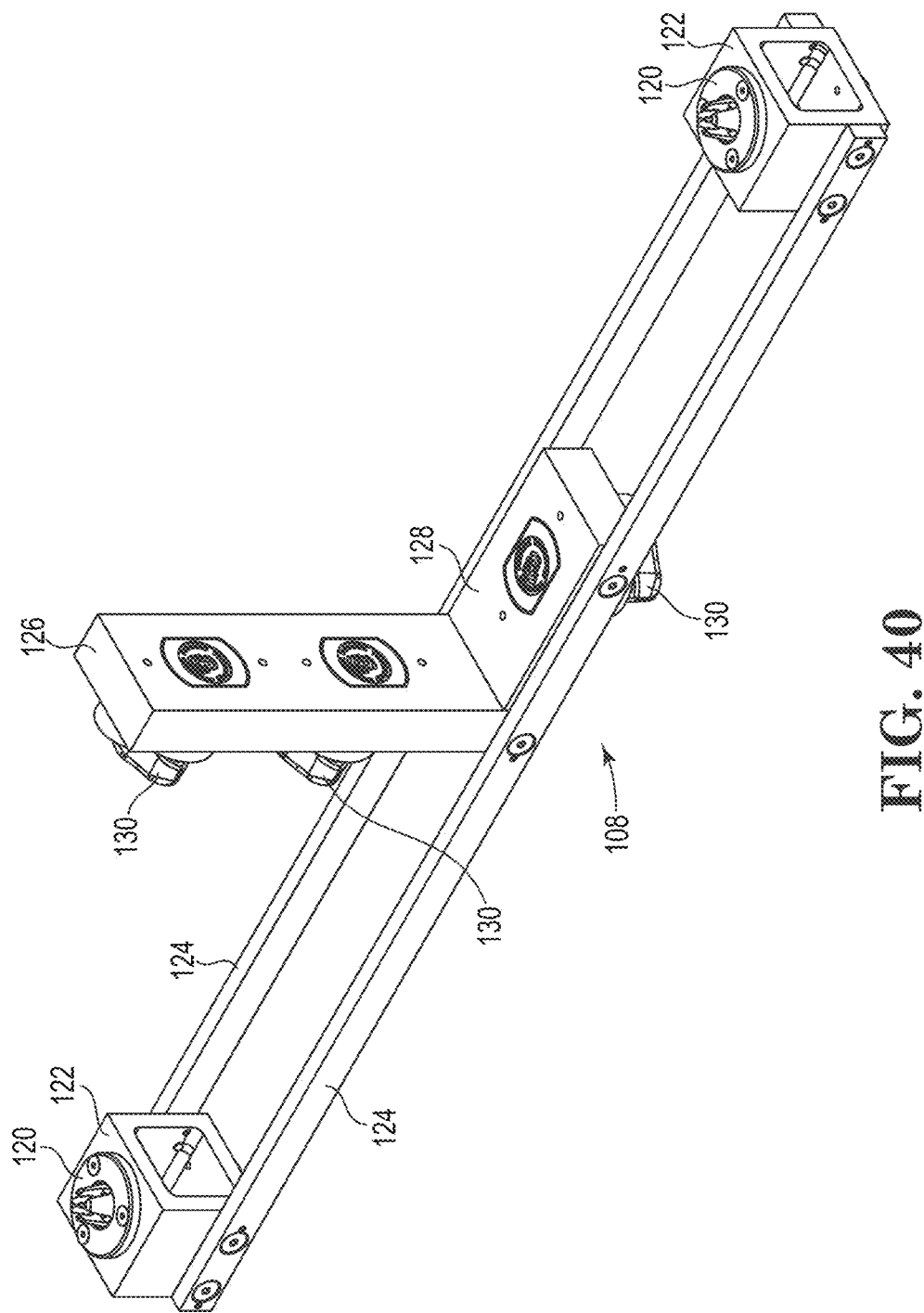
FIG. 40 is a perspective view of the torque box according to certain embodiments of the invention.
Figure 43:
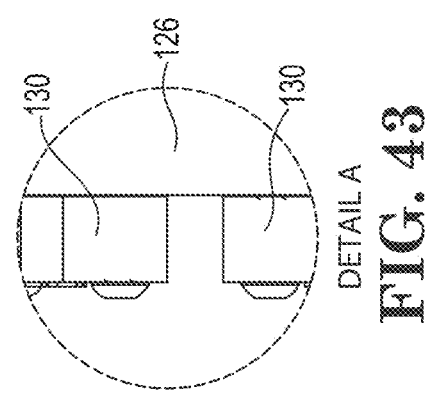
FIG. 43 is a detail view of the torque box according to certain embodiments of the invention.
Figure 44:
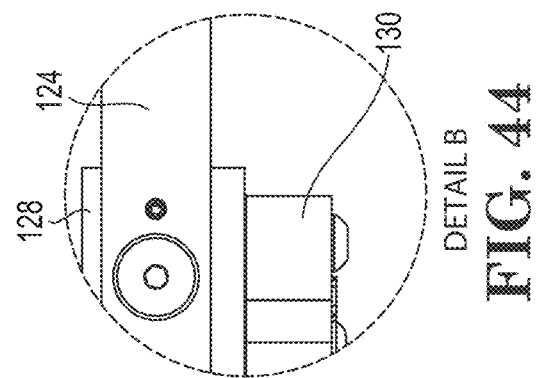
FIG. 44 is another detail view of the torque box according to certain embodiments of the invention.
Figure 41:
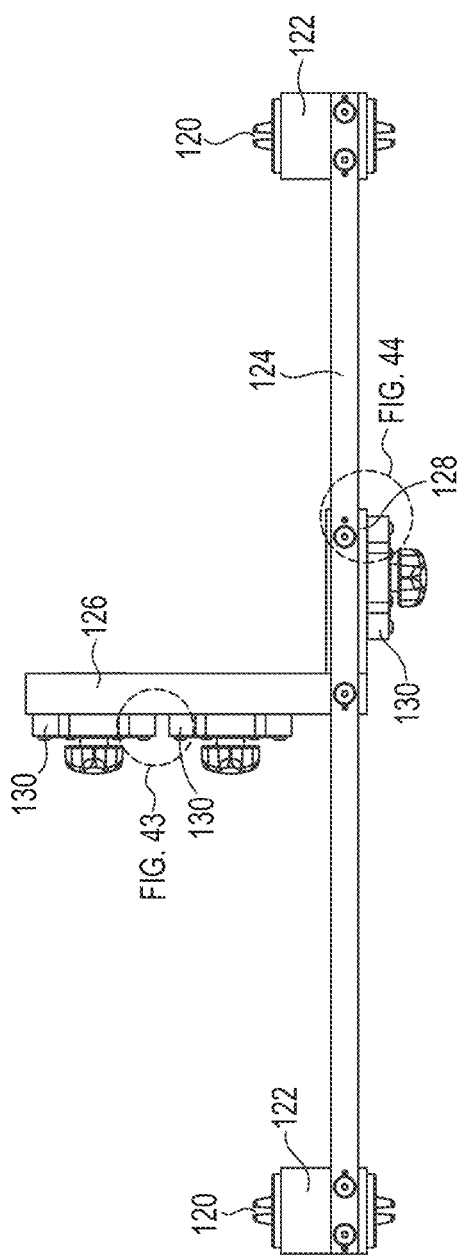
FIG. 41 is a side view of the torque box according to certain embodiments of the invention.
Figure 42:
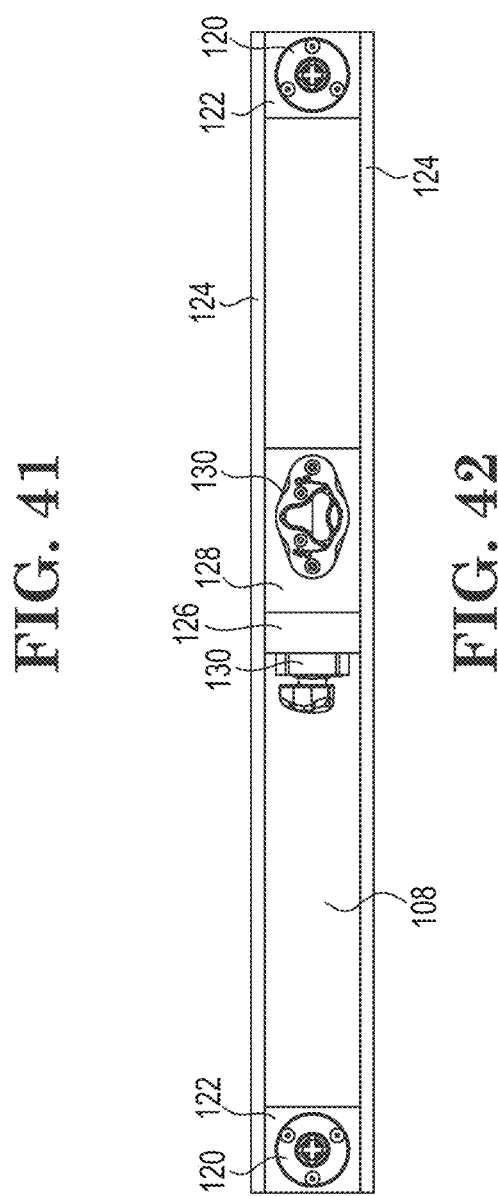
FIG. 42 is a top view of the torque box according to certain embodiments of the invention.

The torque boxes 108 can be coupled to the bottom of the truck's frame as shown in FIGS. 37-38 or atop the frame as shown in FIG. 39. The torque boxes 108 can be attached via magnets, clamps, mechanical fasteners or other suitable means to hold them in place.

As shown in FIG. 38, the two torque box assemblies 108 with their attached targets 104 (which are a known distance apart, e.g. 500 mm) are attached to the truck frame a measurable distance apart (e.g. 12 or more inches apart). Thus, the targets 104 each define a corner of a rectangle whose dimensions are known and can thus be used for accurately orienting the laser scanner 102.

Figure 21:
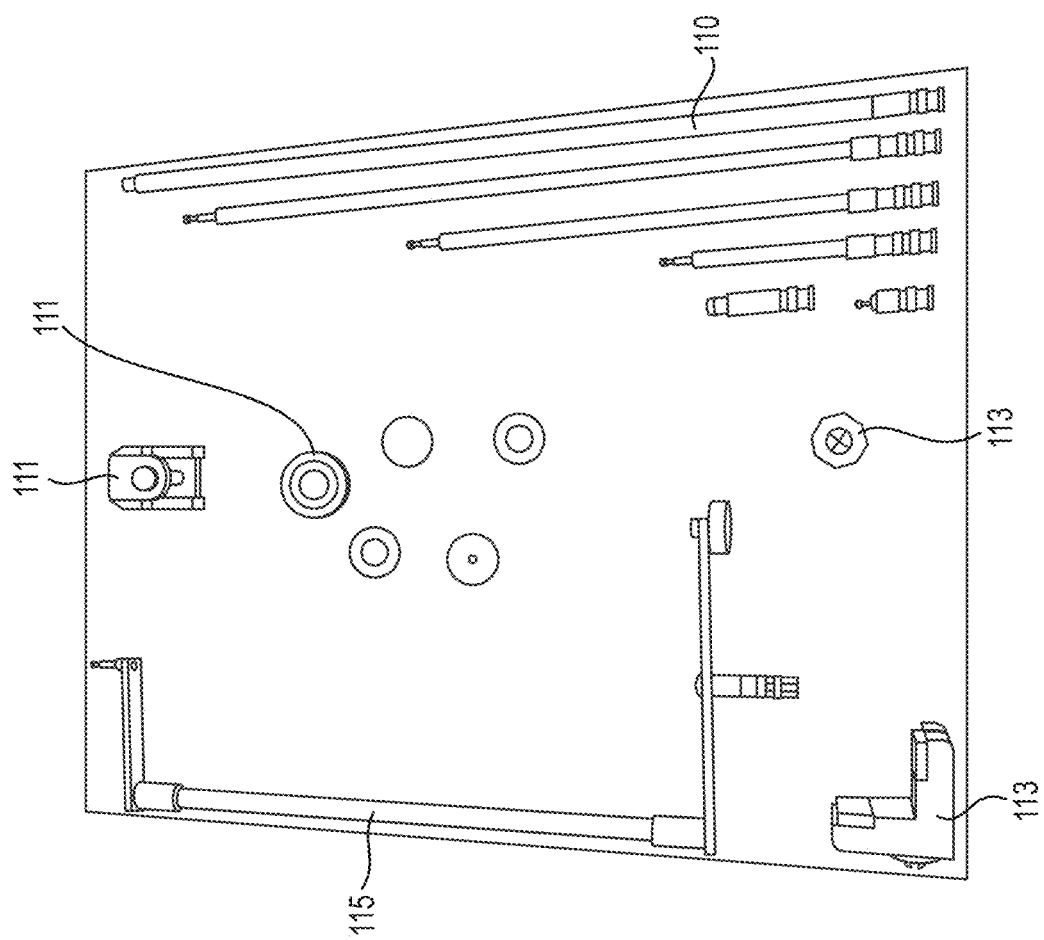
FIG. 21 is a perspective view of components of a vehicle and trailer frame measuring system in accordance with certain embodiments of the invention.
Figure 22:
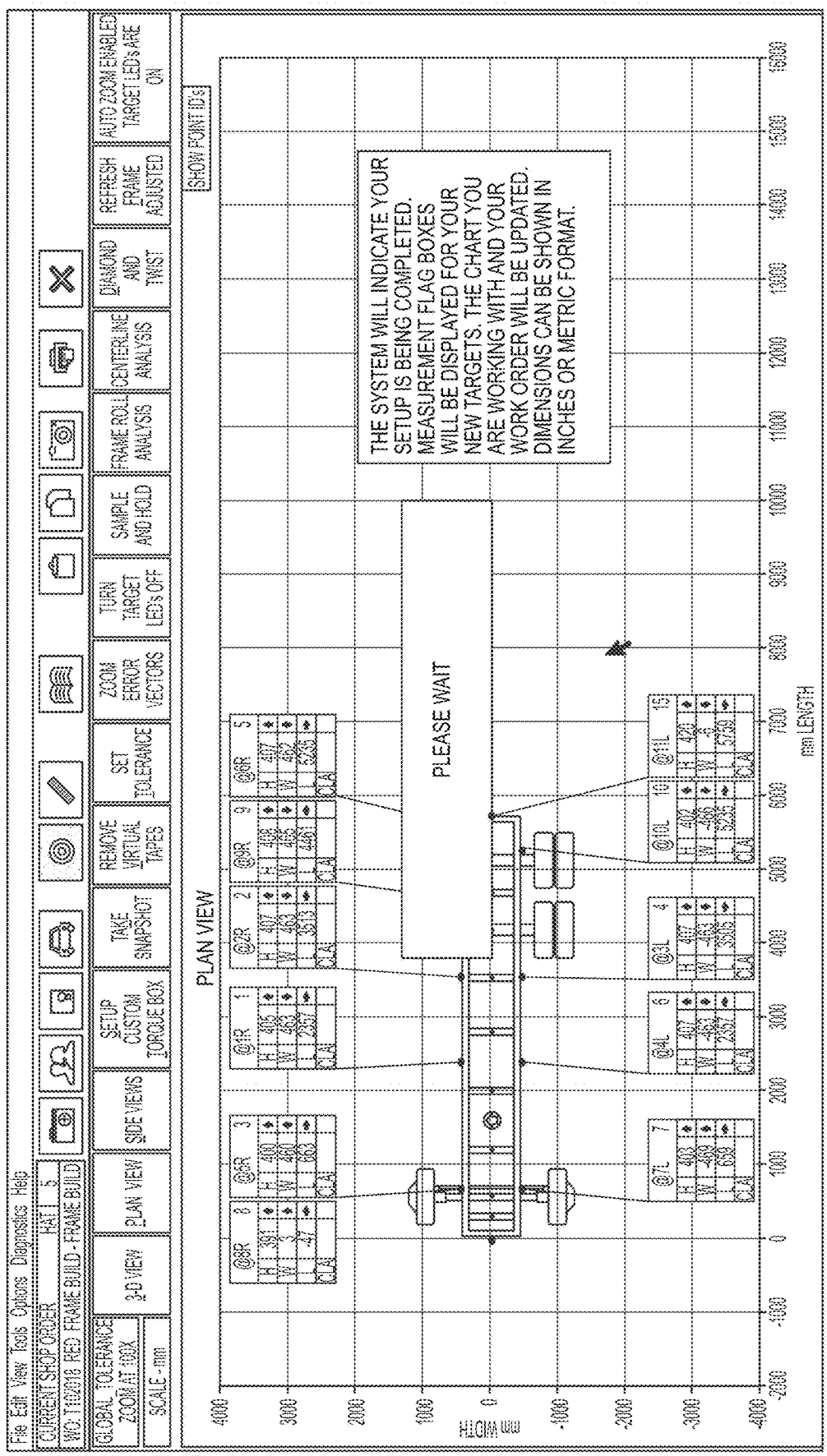
FIGS. 22-36 are additional slides illustrating and describing aspects and steps of a vehicle and trailer frame measuring system in accordance with certain embodiments of the invention.
Figure 23:
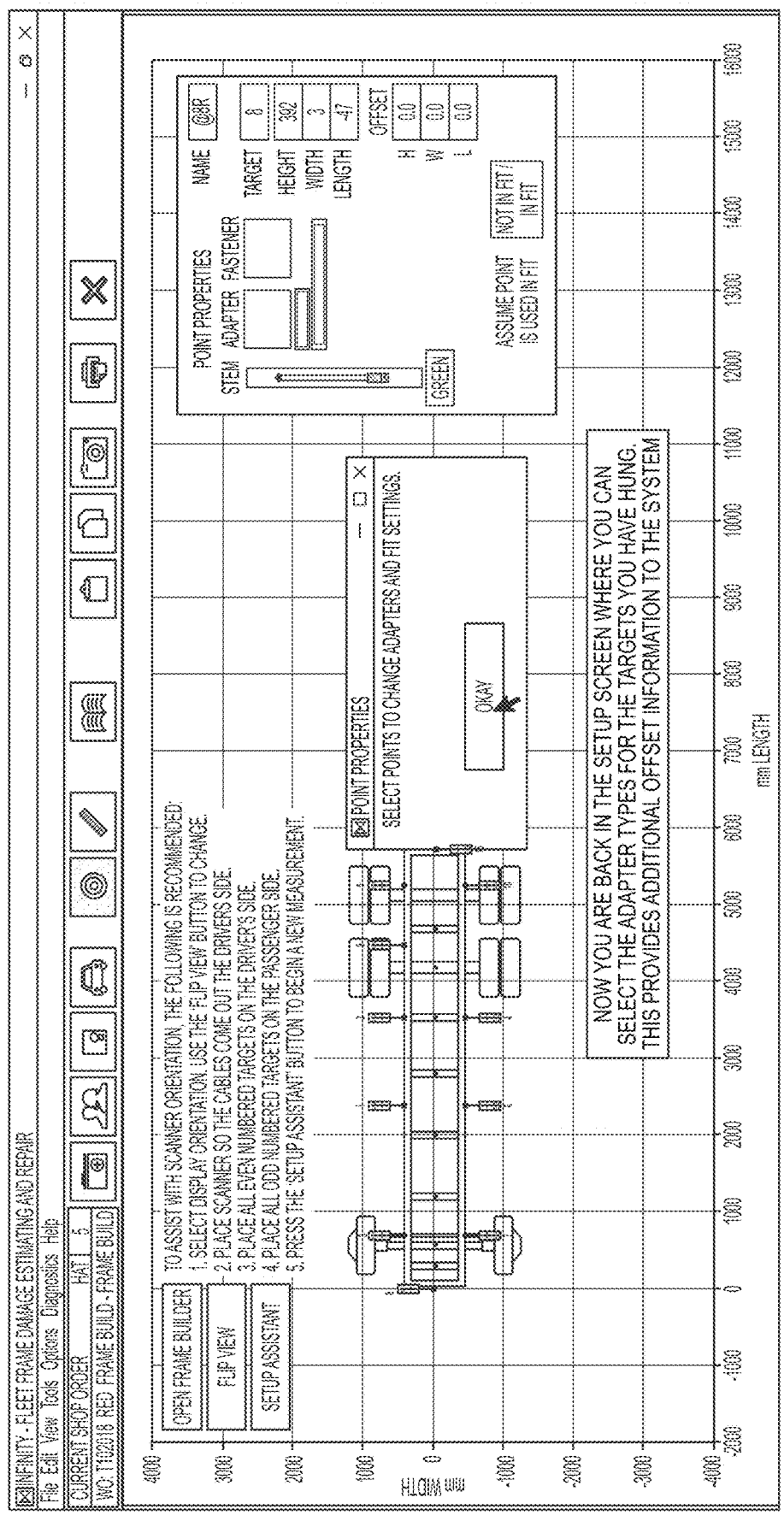
Figure 24:
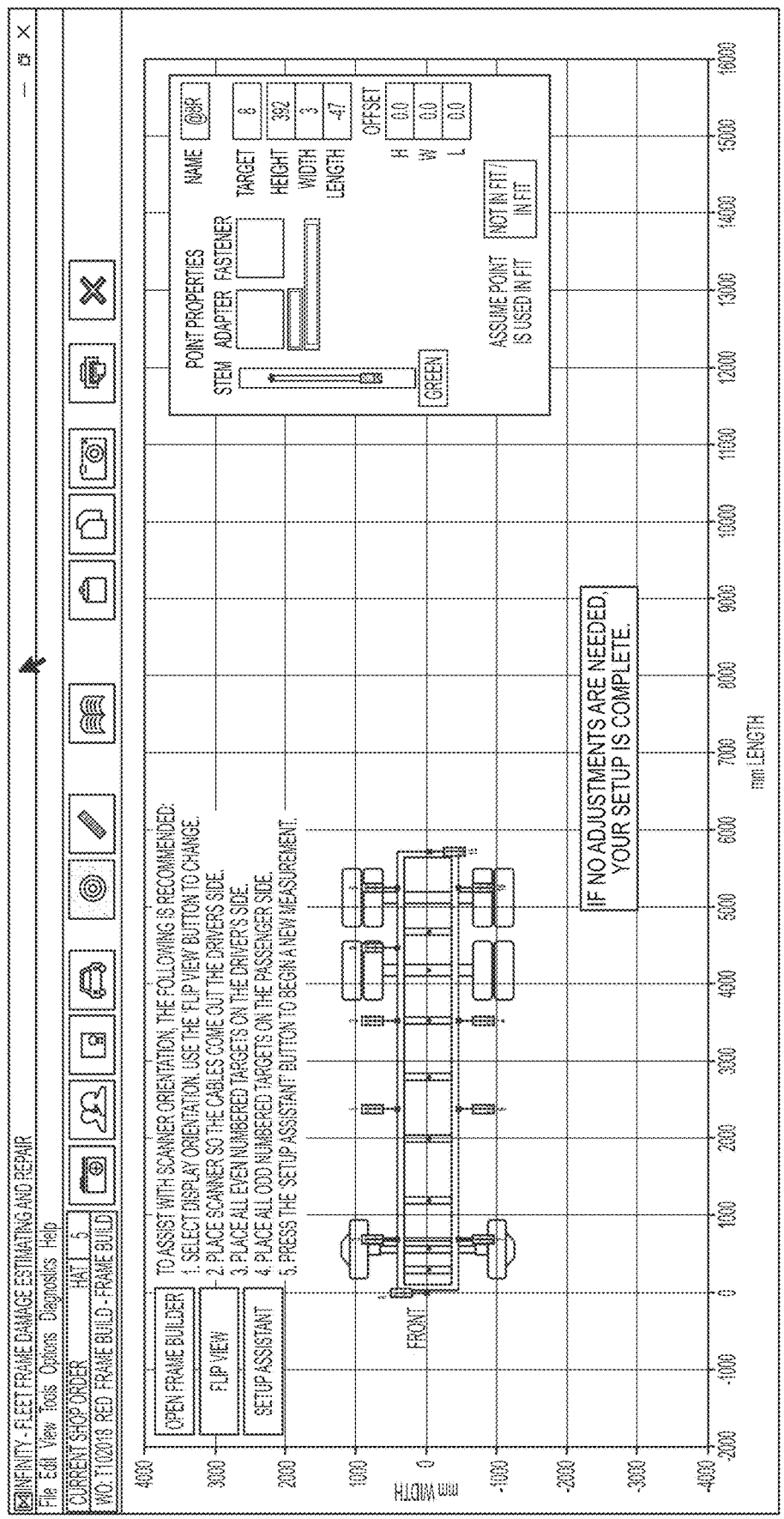

Referring to FIG. 21, a variety of different length stems 110, mechanical adapters 111, magnetic connectors 113 and C-stems 115 can be used to hang the targets 104 at a suitable location and orientation for scanning by the laser scanner 102. The C-stems 115 allow the target to be placed around objects to avoid the target being blocked. The magnetic connectors 113 allow targets to be secured to magnetic parts of the vehicle, while the mechanical adapters 111 allow for hanging targets on materials and in locations that are not magnetic.

As shown in FIGS. 19-20 and 22-24, the user is prompted by the software program to hang targets 104 on the vehicle so that measurements can be taken and displayed. The location of the detected targets is indicated on the diagram on the computer screen.

Figure 25:
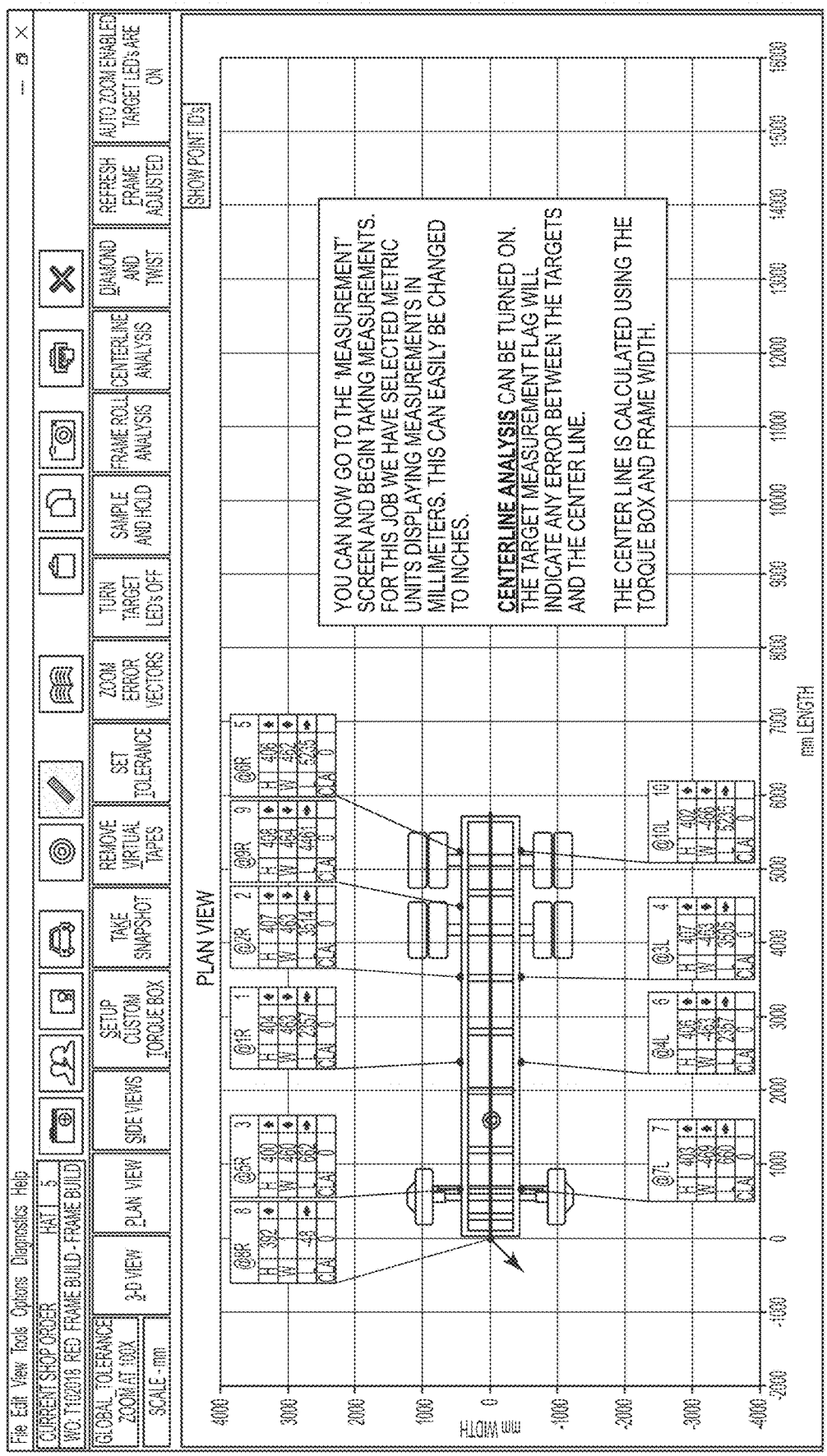
Figure 26:
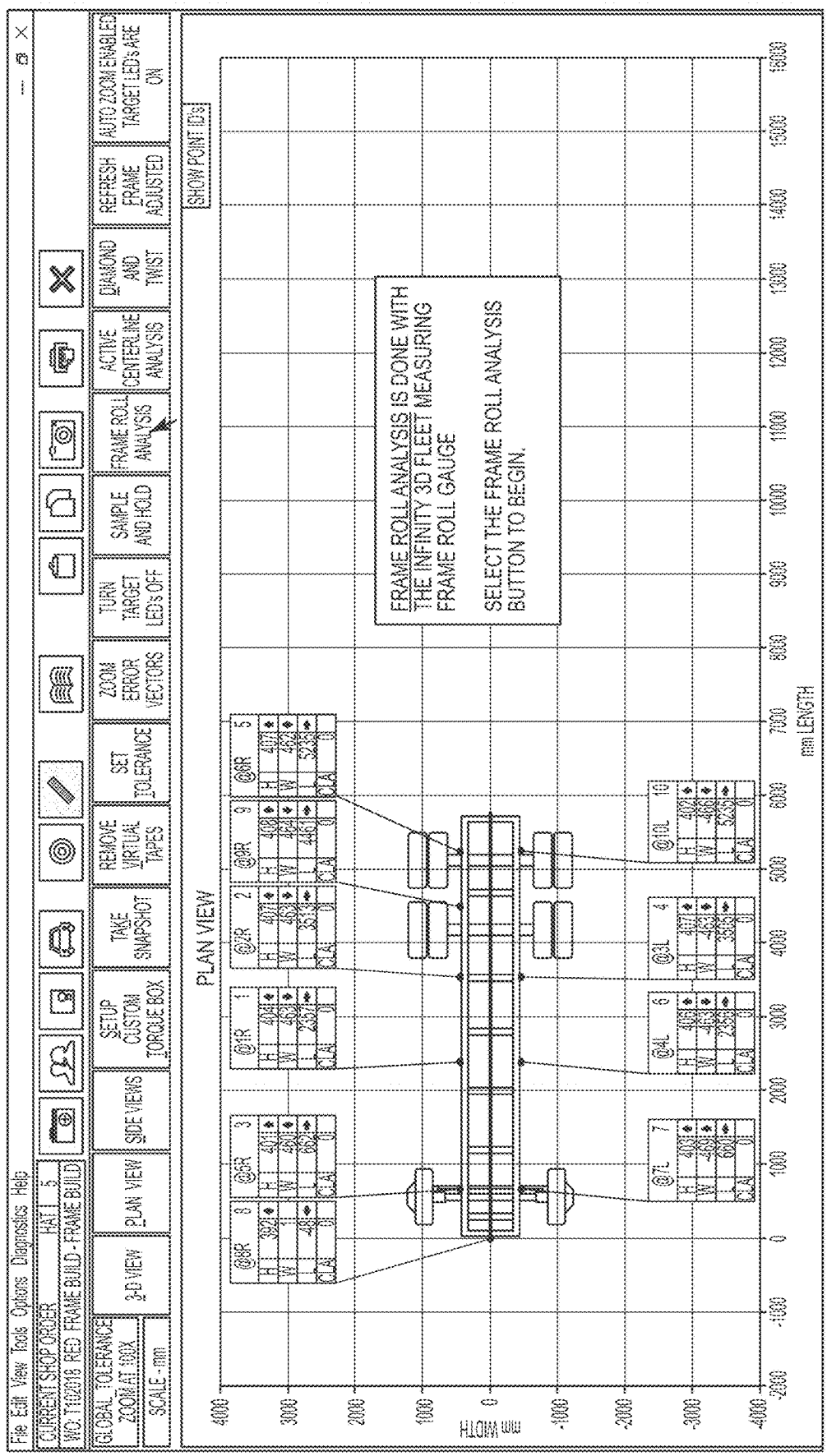
Figure 27:
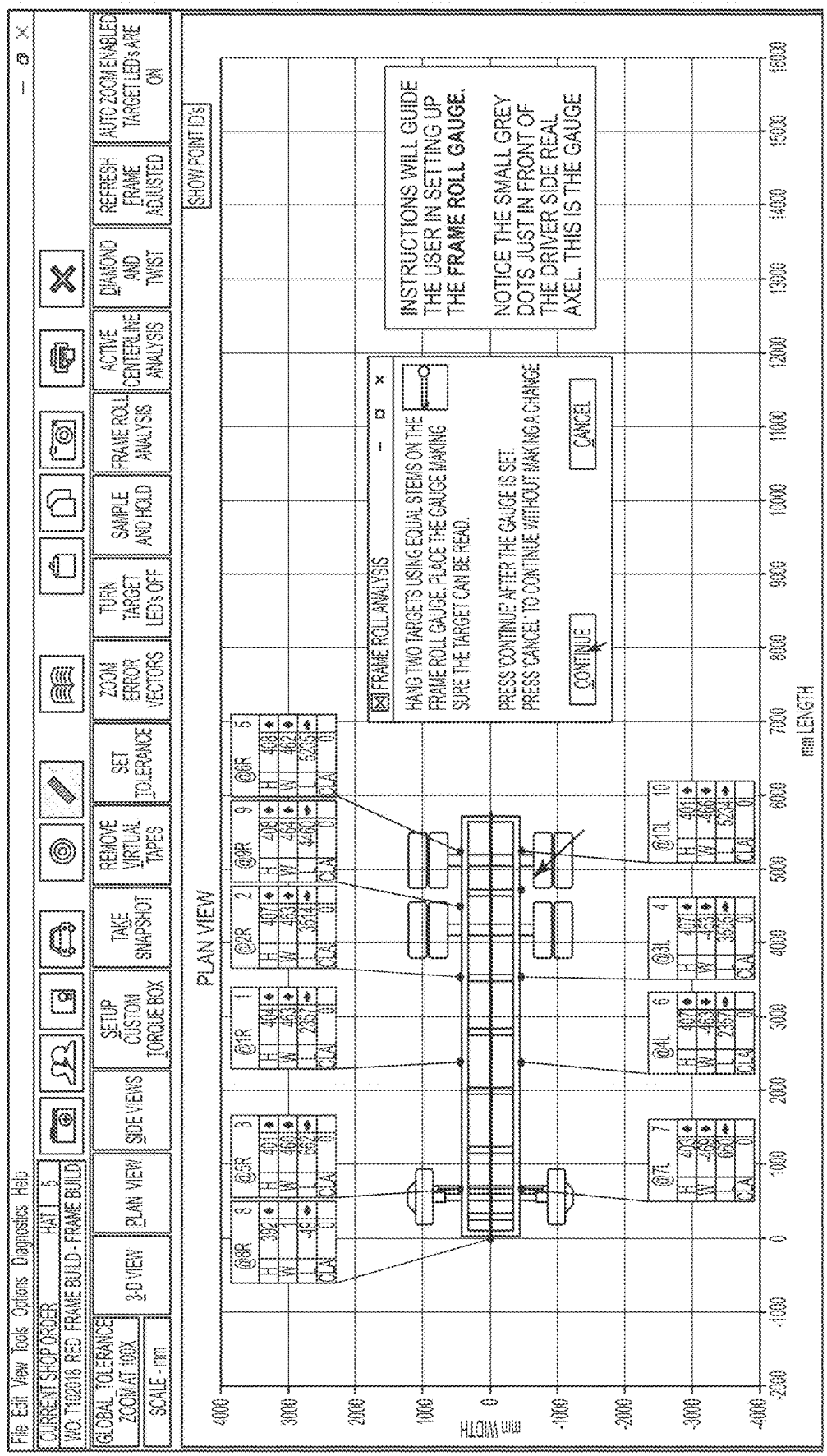
Figure 28:
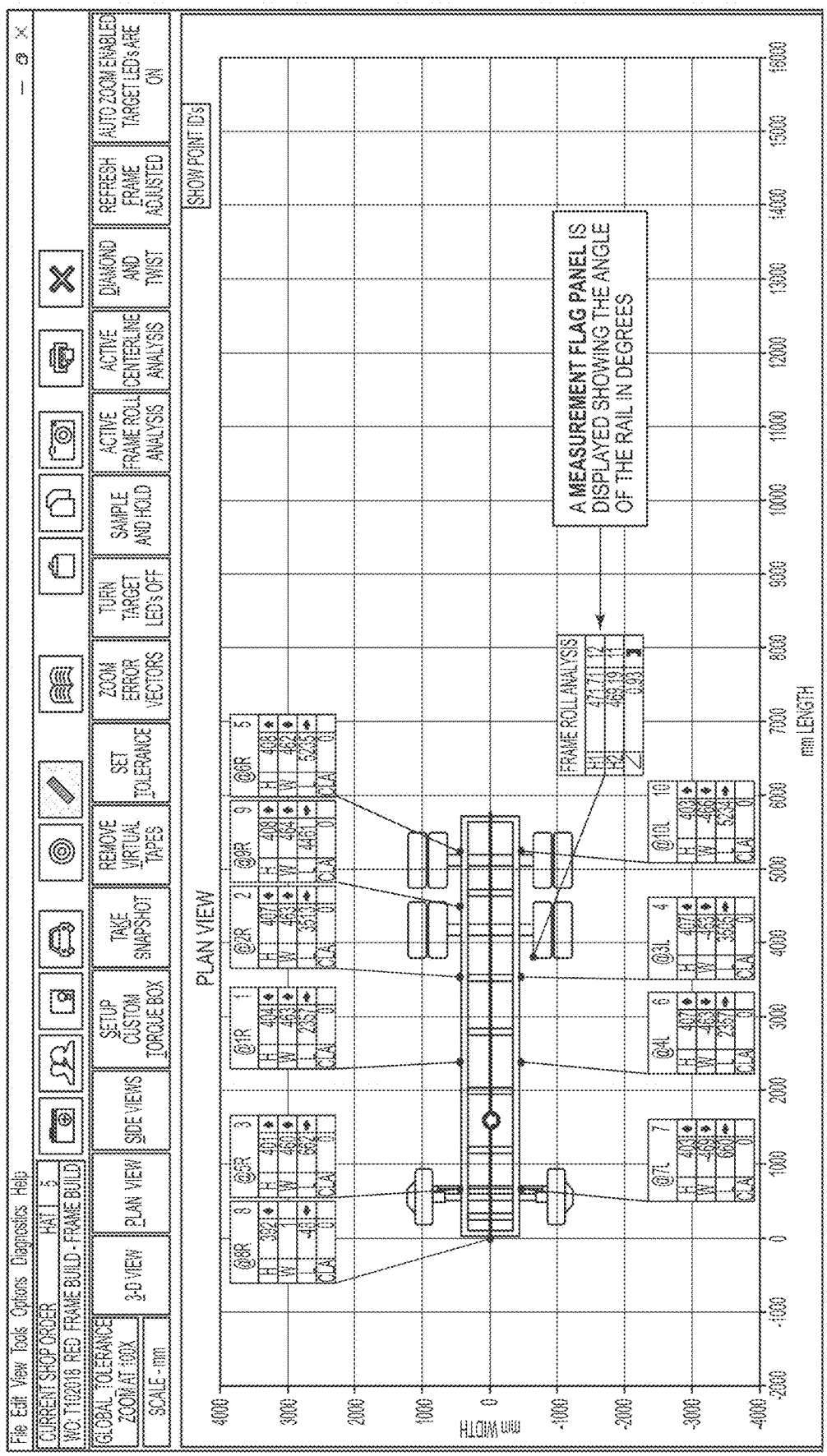
Figure 29:
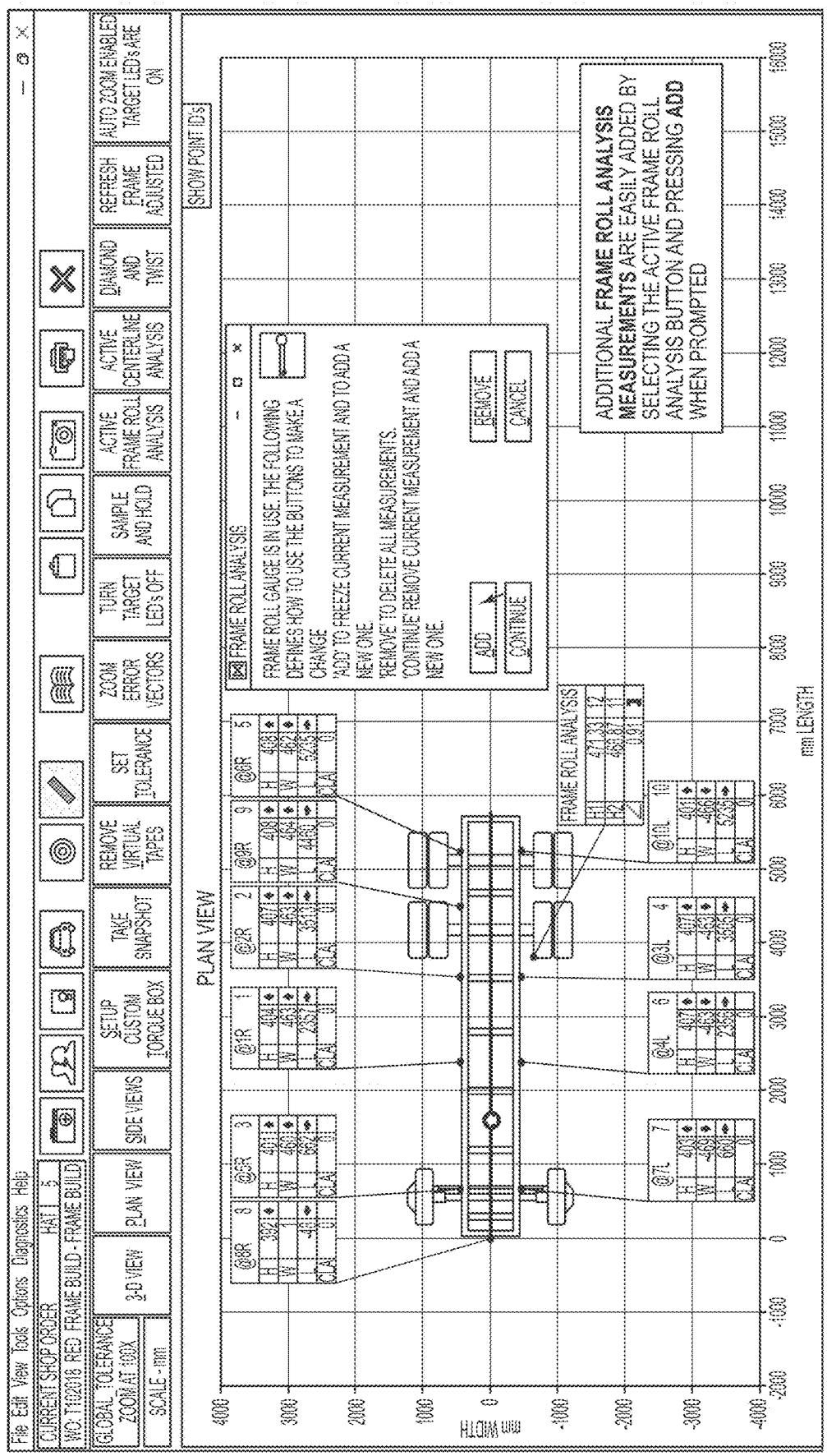
Figure 30:
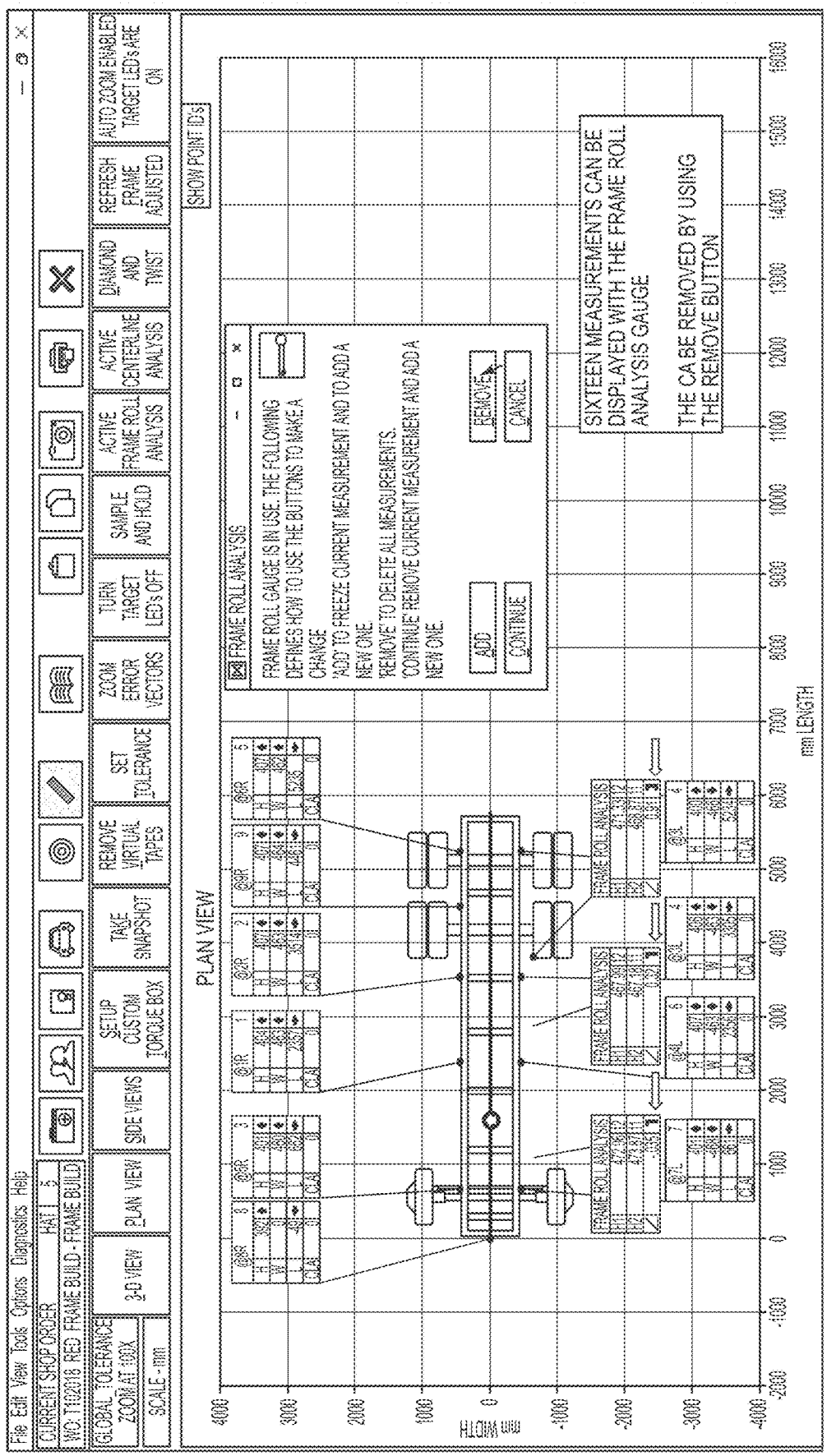
Figure 31:
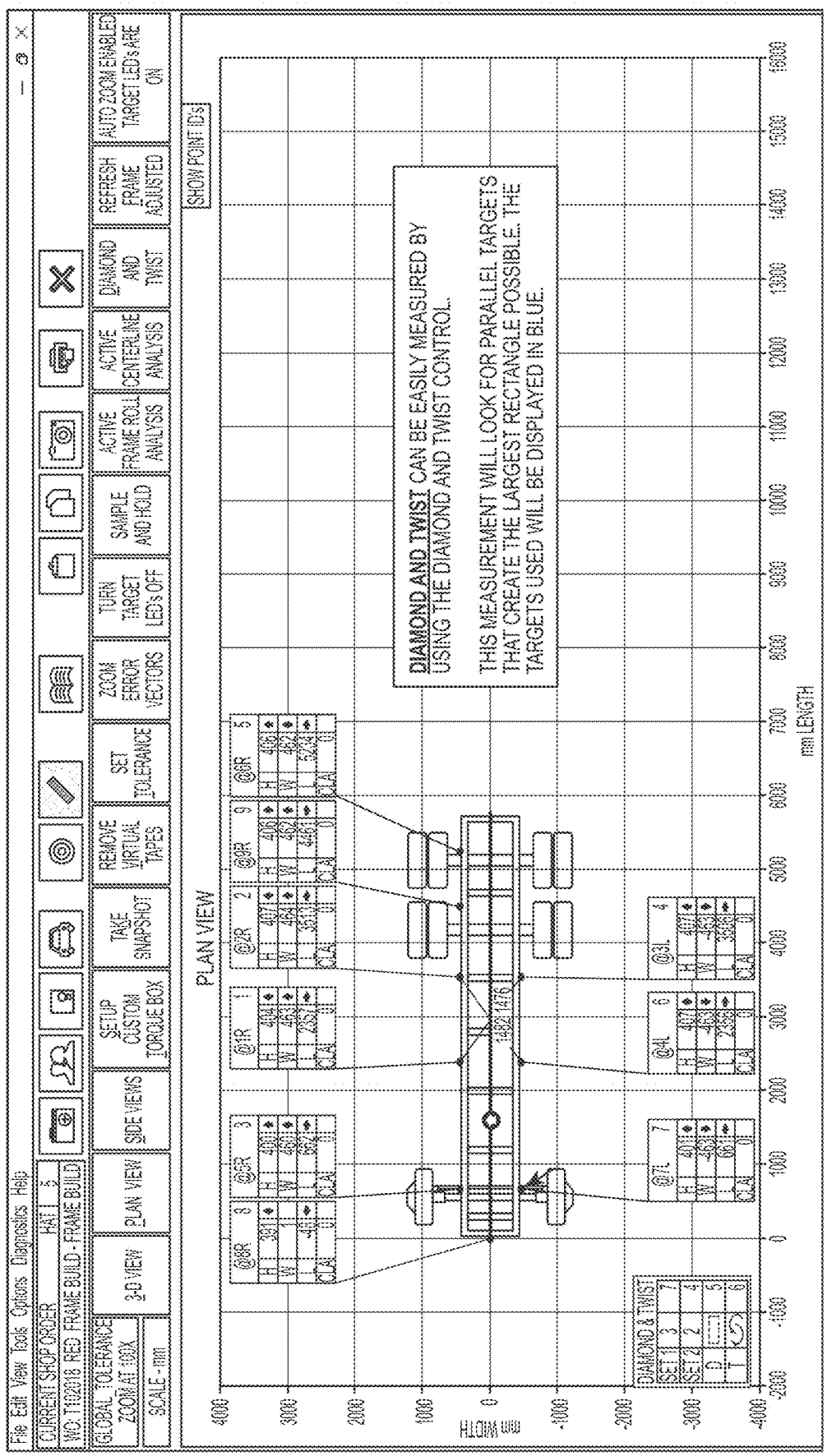
Figure 32:
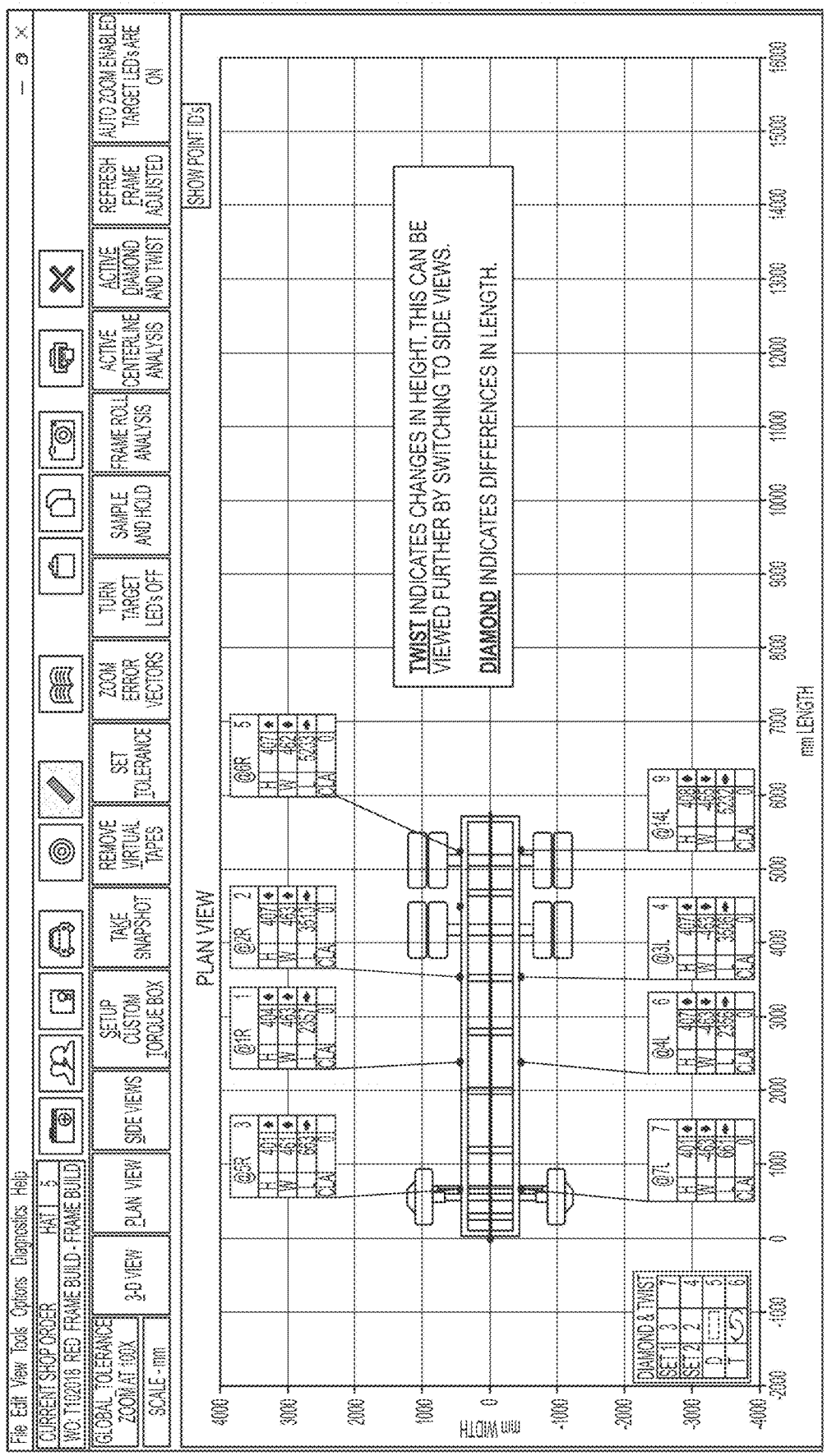
Figure 33:
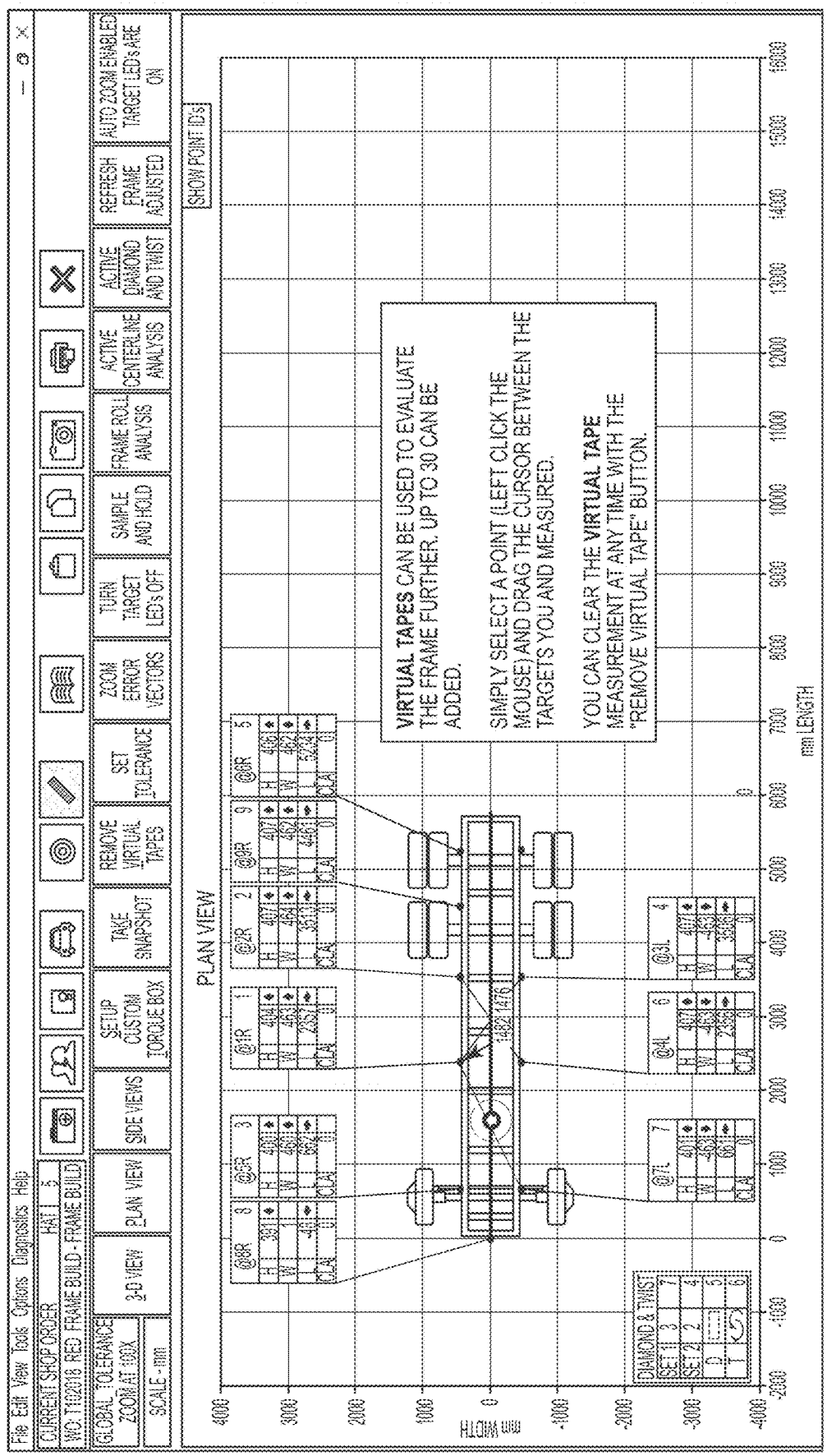
Figure 34:
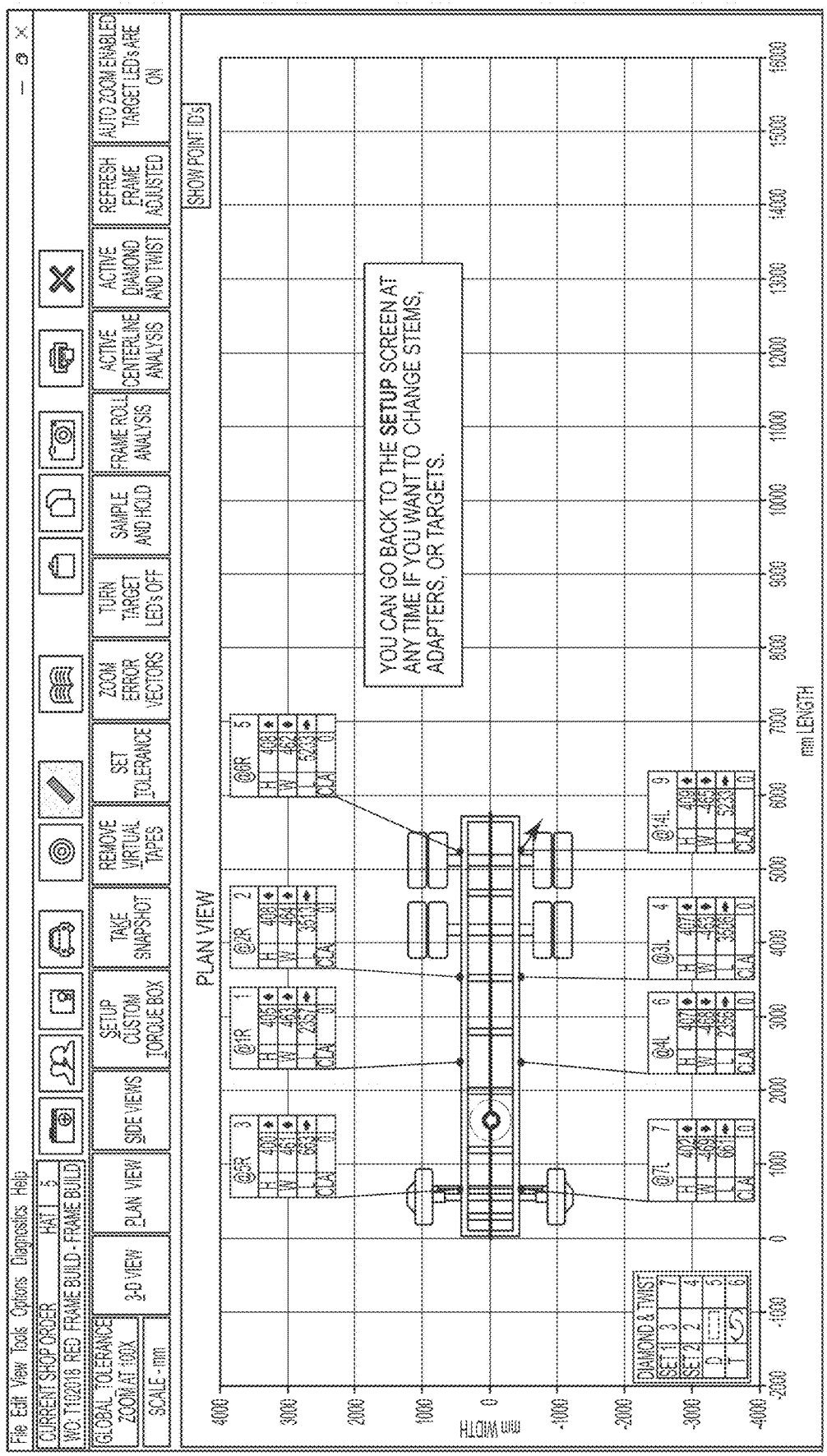
Figure 35:
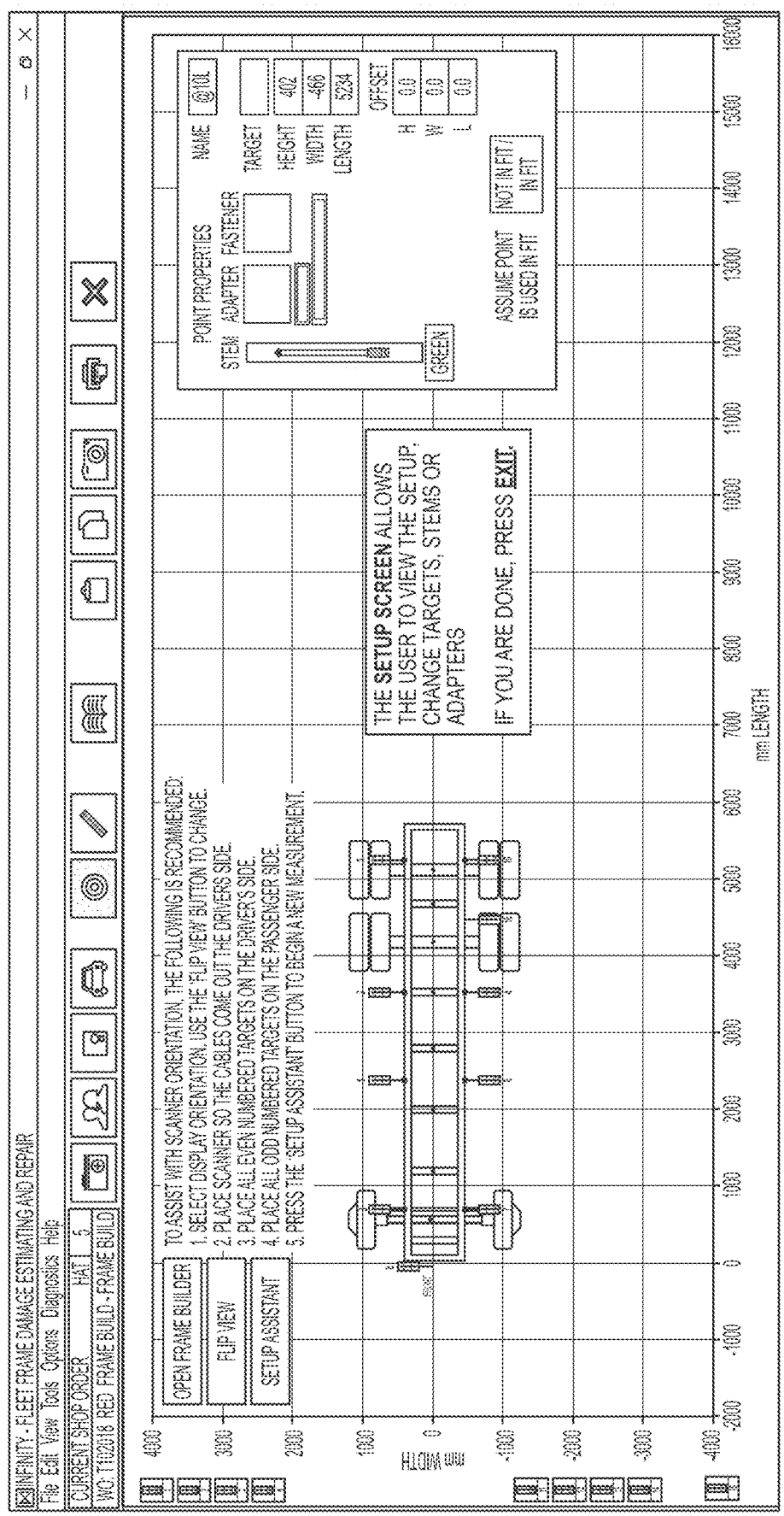
Figure 36:
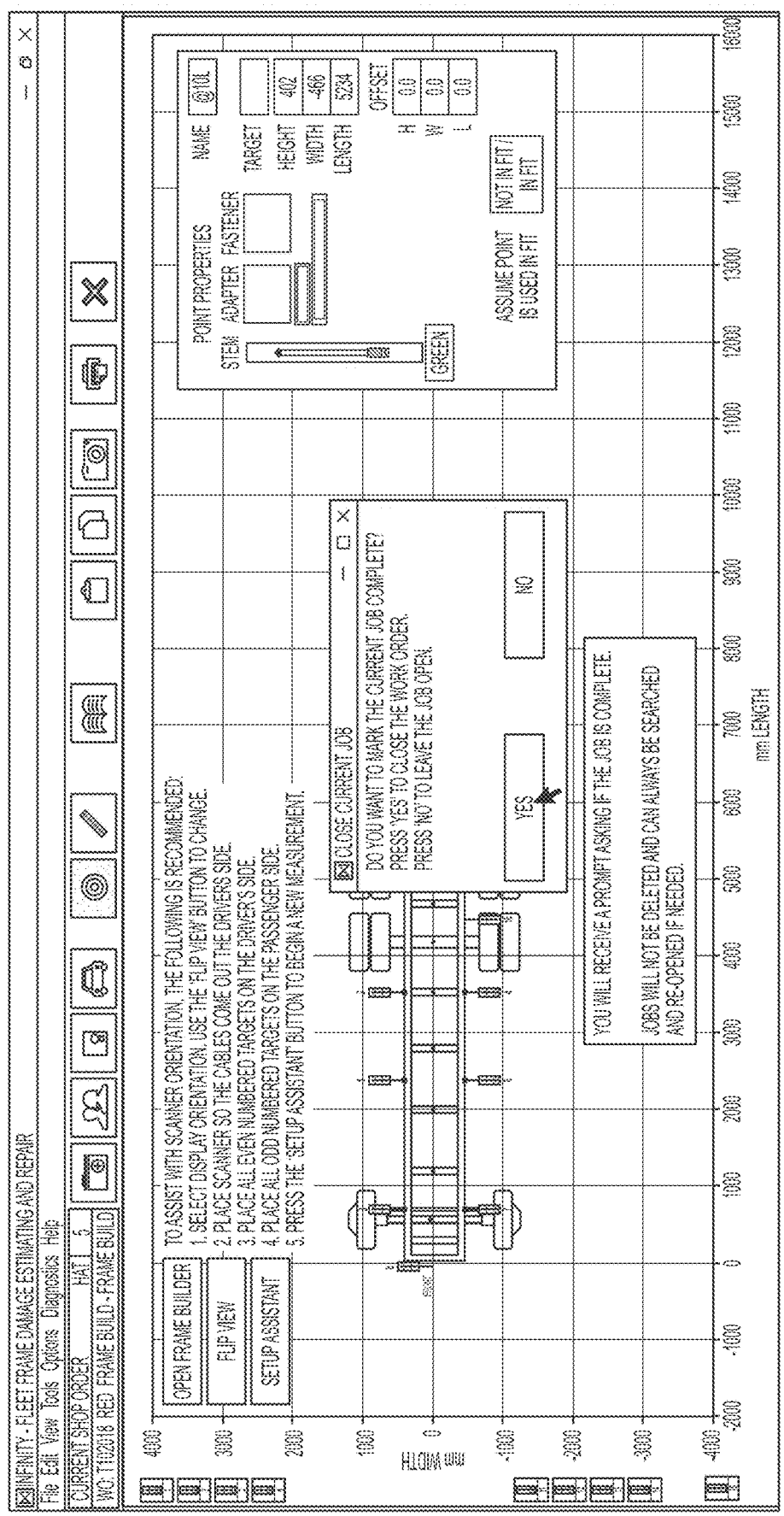

The user is next prompted by the software program to take some measurements as indicated in FIG. 25. For example, the user measures the distance from the front of the truck's frame to the front torque box 108 location on the frame and inputs this data into the software program. This allows the computer system to calculate or triangulate the position of the laser scanner 102 with respect to the frame and provide a data plane parallel to the torque boxes 108. The user can then add the frame width by either a manual input or by hanging a target opposite one of the torque boxes to calculate the centerline of the frame.

After orientation of the scanner is determined, additional electronic targets can be placed at various locations on the vehicle frame in order to obtain additional point measurement properties via the laser scanner. The measurement system will collect this measurement data from the scanner 102, automatically determine the location of these points and place them on the frame drawing in the respective proper locations. These measurements are then displayed on the vehicle measurement display in standard length, width, and height references using either inch or millimeter units (or other measurement unit as selected by the user).

Referring to FIGS. 26-36, various choices for analysis of the displayed points can be performed by the measurement system software to illustrate common frame defect conditions such as diamond, twist, rail roll, sag, side sway, along with resultant combinations. Error limits can be set by the user to allow frame deformation below the set limits to be shown without a corresponding warning being noted. Measurements within the allowed tolerance are displayed in green. Those outside of tolerance range have their own specific warning colors.

The results of the frame analysis are shown on the user's screen, on the electronic target, and can be printed out or emailed for future inspection. The targets can be illuminated and the measurement system can change the color of the targets (e.g. green/red) to match the determined results as depicted on the user's screen.

The frame setup information can be saved for use during the future repair process. The measurement results can also be saved.

The frame is repaired while the targets and laser scanner are still deployed. Thus, during the repair process, the measurement system can continue to display the status of the measurement points in real time. As repairs are performed, the technician thus can easily confirm that repairs have been made sufficient to be within the pre-set dimensional tolerance or specification. A final printout of the complete measurement results can be used to document that the repairs are completed properly.

The measurement system has numerous benefits. The measuring system can be quickly setup on a heavy duty truck or trailer frame, obtain measurements, automatically analyze the results, and then document the complete process with an easily understood format. An accuracy of +/−1 millimeter across most frame geometry can be achieved. This is far better than conventional technology. Analysis of dimensions can be performed in multiple planes simultaneously in real time, which is not possible with conventional measuring techniques. The user also has the ability to perform measurements and provide a detailed analysis without an existing vehicle database being used. The user can also use the measurement system to develop vehicle database points for use in the future.

FIGS. 37-43 illustrate aspects of the side rail torque box assembly 108. A magnetic adaptor 120 is secured atop an adaptor block 122. An adaptor block 122 is disposed at each longitudinal end of a pair of horizontally-extending rails 124. A vertical magnet block 126 is disposed at a longitudinal mid-point of the rails 124. The rails 124 are spaced apart from one another and extend parallel to one another. A horizontal magnet block 128 is disposed adjacent to the vertical magnet block 126. A pair of magnetic jigs 130 are disposed in the vertical magnet block 126 and another magnetic jig 130 is disposed in the horizontal magnet block 128. Each of the adaptor blocks 122, vertical magnet block 126 and horizontal magnet block 128 are disposed between the pair of spaced-apart rails 124.

The targets 104 can be coupled to the adaptor blocks 122 of the torque box assembly 108 via magnets and/or a fastener. Magnets can also be provided to the vertical and horizontal magnet blocks 126, 128 to couple the torque box assembly 108 to the truck frame.

The structural components of the torque box 108 can be formed from a variety of materials, including metals (e.g. steel or aluminum), composites and rigid plastics. Any combination of these materials can be employed.

The dimensions, proportions, scale and configurations of the various components are merely example embodiments and can be varied unless specifically limited in a given claim. Thus, the dimensions, proportions, scale and configurations can be varied without departing from the scope of the invention except where explicitly limited by a given claim.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A system for measuring a frame of a vehicle or a trailer, the system comprising:
    a computer disposed on a cart;
    a laser scanner communicatively coupled to the computer;
    a plurality of targets for the laser scanner; and
    a torque box assembly that is configured to attach to the frame the torque box assembly comprising:
        a pair of spaced apart and longitudinally elongated rails that are aligned parallel to one another;
        a pair of adaptor blocks, each one disposed at a longitudinal end of the pair of spaced apart and longitudinally elongated rails;
        a vertical magnet block disposed at a longitudinal mid-point of the rails that is aligned perpendicular to the longitudinal elongation of the rails; and
        a horizontal magnet block disposed adjacent to the vertical magnet block,
        wherein each of the pair of adaptor blocks, the vertical magnet block and the horizontal magnet block are disposed between the pair of spaced apart and longitudinally elongated rails.

2. The system of claim 1, further comprising a plurality of different length stems that connect the plurality of targets to the frame or the torque box.

3. The system of claim 1, further comprising a plurality of mechanical adapters that connect the plurality of targets to the frame or the torque box.

4. The system of claim 1, further comprising a plurality of magnetic connectors that connect the plurality of targets to the frame or the torque box.

5. The system of claim 1, further comprising a C-stem that connects the plurality of targets to the frame or the torque box.

6. The system of claim 1, wherein the torque box assembly further comprises a magnetic adapter secured to each of the adaptor blocks.

7. The system of claim 1, wherein the torque box assembly further comprises a first magnetic jig disposed in the vertical magnet block and a second magnetic jig disposed in the horizontal magnet block.

8. The system of claim 7, wherein the torque box assembly further comprises a third magnetic jig disposed in the vertical magnet block.

9. The system of claim 1, wherein the computer is configured to:
    illustrate the frame of the vehicle or the trailer a display screen; and
    indicate a warning on the display screen for any frame measurements that are outside of a pre-set tolerance range such that the frame measurements are associated with the frame defect.

10. A torque box assembly for a vehicle and trailer frame measuring system, the torque box assembly comprising:
    a pair of spaced apart and longitudinally elongated rails that are aligned parallel to one another;
    a first adaptor block disposed at a first longitudinal end of the pair of spaced apart and longitudinally elongated rails;
    a second adaptor block disposed at a second longitudinal end of the pair of spaced apart and longitudinally elongated rails;
    a vertical magnet block disposed at a longitudinal mid-point of the rails that is aligned perpendicular to the longitudinal elongation of the rails; and
    a horizontal magnet block disposed adjacent to the vertical magnet block,
    wherein each of the first adaptor block, the second adaptor block, the vertical magnet block and the horizontal magnet block are disposed between the pair of spaced apart and longitudinally elongated rails.

11. The torque box assembly of claim 10, wherein the torque box assembly further comprises a first magnetic adapter secured to the first adaptor block.

12. The torque box assembly of claim 10, wherein the torque box assembly further comprises a first magnetic jig disposed in the vertical magnet block and a second magnetic jig disposed in the horizontal magnet block.

13. The torque box assembly of claim 12, wherein the torque box assembly further comprises a third magnetic jig disposed in the vertical magnet block.

14. A method of measuring vehicle or trailer frames, the method comprising:
    attaching a first torque box to the vehicle or trailer frame the first torque box comprising:
        a pair of spaced apart and longitudinally elongated rails that are aligned parallel to one another;
        a pair of adaptor blocks, each one disposed at a longitudinal end of the pair of spaced apart and longitudinally elongated rails;
        a vertical magnet block disposed at a longitudinal mid-point of the rails that is aligned perpendicular to the longitudinal elongation of the rails; and
        a horizontal magnet block disposed adjacent to the vertical magnet block,
        wherein each of the pair of adaptor blocks, the vertical magnet block and the horizontal magnet block are disposed between the pair of spaced apart and longitudinally elongated rails;
    attaching a second torque box to the vehicle or trailer frame spaced apart from the first torque box;
    attaching a first laser scanning target to a first longitudinal end of the first torque box;
    attaching a second laser scanning target to a second longitudinal end of the first torque box;
    attaching a third laser scanning target to a first longitudinal end of the second torque box; and attaching a fourth laser scanning target to a second longitudinal end of the second torque box.

15. The method of claim 14, further comprising triangulating a position of a laser scanner with respect to the vehicle or trailer frame by scanning the first, second, third and fourth targets with the laser scanner and using a measured distance between the front of the vehicle or trailer frame and the first torque box.

16. The method of claim 15, further comprising determining a frame width by scanning with the laser scanner a fifth laser scanning target attached to the vehicle or trailer frame to calculate a centerline of the vehicle or trailer frame.

17. The method of claim 15, after triangulating the position of the laser scanner, further comprising:
attaching additional laser scanning targets to the vehicle or trailer frame in positions spaced apart from the first torque box and the second torque box; and
performing a scan of the additional laser scanning targets with the laser scanner to obtain measurement data.

18. The method of claim 17, further comprising evaluating the measurement data to determine if a frame defect is present.

19. The method of claim 18, further comprising:
illustrating the vehicle or trailer frame on a display screen of a computing system that is coupled to the laser scanner; and
indicating a warning on the display screen of the computing system for any measurements that are outside of a pre-set tolerance range such that the measurements are associated with the frame defect.

* * * * *